United States Patent [19]
Yokoyama et al.

[11] Patent Number: 5,519,875
[45] Date of Patent: May 21, 1996

[54] DISTRIBUTED PROCESSING SYSTEM FOR MODULES, EACH HAVING MODULARIZED OBJECTS

[75] Inventors: Takanori Yokoyama; Masaru Shimada; Tadashi Kamiwaki; Masahiko Saito; Yoshiki Kobayashi; Hiroaki Nakanishi, all of Hitachi, Japan

[73] Assignee: Hitachi, Ltd., Tokyo, Japan

[21] Appl. No.: 926,519

[22] Filed: Aug. 10, 1992

[30] Foreign Application Priority Data

Aug. 8, 1991 [JP] Japan .................................. 3-199153
Aug. 8, 1991 [JP] Japan .................................. 3-199623

[51] Int. Cl.⁶ ...................................................... G06F 15/16
[52] U.S. Cl. .................... 395/800; 395/200.01; 395/650; 364/284.3; 364/284.4
[58] Field of Search ............................ 395/800, 600, 395/200, 325

[56] References Cited

U.S. PATENT DOCUMENTS

| | | | |
|---|---|---|---|
| 4,253,145 | 2/1981 | Goldberg | 395/500 |
| 4,694,396 | 9/1987 | Weisshaar et al. | 395/200 |
| 5,047,925 | 9/1991 | Kun et al. | 395/200 |
| 5,245,608 | 9/1993 | Deaton, Jr. et al. | 370/94.1 |

FOREIGN PATENT DOCUMENTS 61-267859  11/1986  Japan .
1-166158   6/1989   Japan .
1-166159   6/1989   Japan .

OTHER PUBLICATIONS

Kraemer, "Product Development Using Object–Oriented Software Technology," Hewlett–Packard Journal, V40,N4, Aug. 1989, p. 871.

Primary Examiner—Alyssa H. Bowler
Assistant Examiner—Walter D. Davis, Jr.
Attorney, Agent, or Firm—Antonelli, Terry, Stout & Kraus

[57] ABSTRACT

A distributed processing system capable of realizing efficient management of a multiplicity of objects in a large scale distributed processing comprises an objectification unit which makes it possible to handle an assembly of objects as one object and a message transfer unit by which a request for a processing to one object provided by objectification by the objectification unit is made to an optimal one of plural objects subjected to objectification.

8 Claims, 32 Drawing Sheets

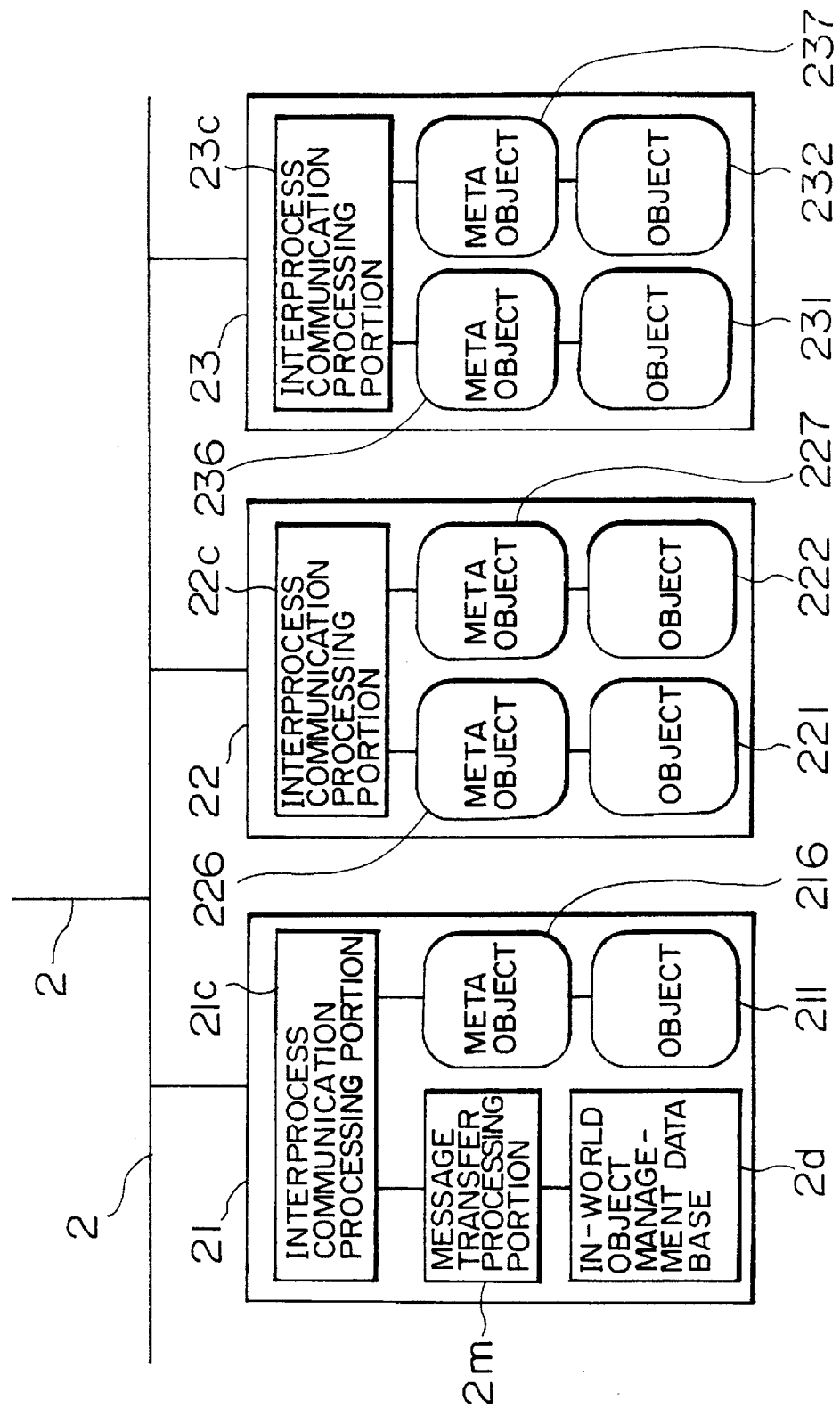

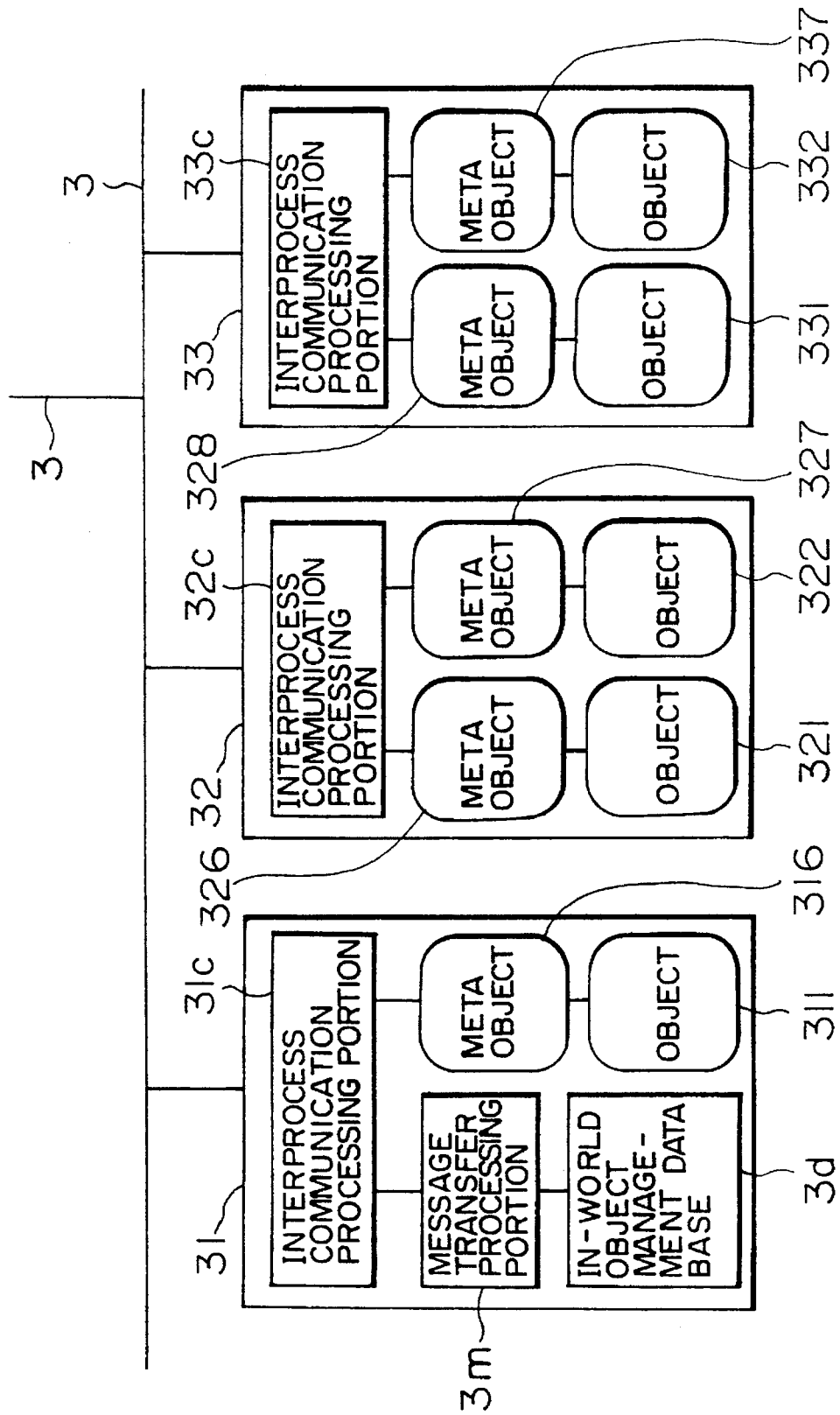

| PROCESSABLE MESSAGE INFORMATION OF META OBJECT 126 WITH OBJECTIFICATION PROCESSING FUNCTION ||| 
|---|---|---|
| NAME OF ASSOCIATED OBJECT | NAME OF PROCESSABLE MESSAGE | FUNCTION NAME |
| OBJECT 121 | MESSAGE b | FUNCTION B |
|  | MESSAGE c | FUNCTION C |
|  | MESSAGE d | FUNCTION D |

FIG.16A

INFORMATION MANAGEMENT IN IN-WORLD DATA BASE OF OBJECT WORLD 1w — 1d

| OBJECT NAME | COMPUTER ADDRESS | PORT NUMBER | ACCEPTABLE MESSAGE NAME | FUNCTION NAME |
|---|---|---|---|---|
| OBJECT 111 | 11 | 101 | MESSAGE a | FUNCTION A |
| OBJECT 121 | 12 | 101 | MESSAGE b | FUNCTION B |
| | | | MESSAGE c | FUNCTION C |
| | | | MESSAGE d | FUNCTION D |
| OBJECT 122 | 12 | 102 | MESSAGE e | FUNCTION E |
| OBJECT 131 | 13 | 101 | MESSAGE c | FUNCTION F |
| | | | MESSAGE g | FUNCTION G |
| OBJECT 132 | 13 | 102 | MESSAGE e | FUNCTION I |
| | | | MESSAGE f | FUNCTION K |
| | | | MESSAGE h | FUNCTION H |

FIG. 16B

INFORMATION MANAGEMENT IN IN-WORLD DATA BASE OF OBJECT WORLD 2w

| OBJECT NAME | COMPUTER ADDRESS | PORT NUMBER | ACCEPTABLE MESSAGE NAME | FUNCTION NAME |
|---|---|---|---|---|
| OBJECT 211 | 21 | 101 | MESSAGE j | FUNCTION J |
| OBJECT 221 | 22 | 101 | MESSAGE k | FUNCTION D / PART |
|  |  |  | MESSAGE g | FUNCTION B |
| OBJECT 222 | 22 | 102 | MESSAGE k | FUNCTION D / PART |
|  |  |  | MESSAGE m | FUNCTION C |
| OBJECT 231 | 23 | 101 | MESSAGE n | FUNCTION N |
|  |  |  | MESSAGE k | FUNCTION D / PART |
| OBJECT 232 | 23 | 102 | MESSAGE p | FUNCTION P |
|  |  |  | MESSAGE k | FUNCTION D / PART |
|  |  |  | MESSAGE k | FUNCTION D / PART |

DISTRIBUTED PROCESSING SYSTEM FOR MODULES, EACH HAVING MODULARIZED OBJECTS

BACKGROUND OF THE INVENTION

1. Field of the Invention

The present invention relates to a distributed processing system suitable for large scale distributed processing, and more particularly to a distributed processing system including a plurality of networks to which one or more computers are connected.

2. Description of the Prior Art

Recently, a distributed processing has been used in a variety of fields. In order to realize a distributed processing with high efficiency, it is necessary to make efficient management and utilization of resources on each computer and to provide communication between computers with high efficiency. Some systems have hitherto been proposed for such a purpose.

There is known a distributed processing system, as disclosed by, for example, JP-A-(SHO)61267859, which is provided with a process management table in which the state, identification number, node address, etc. of processes on each node are registered. Upon transmission of a message, a supervisor process makes reference to the process management table to transmit the message, thereby allowing message transmission with high efficiency.

There is also known a distributed resource accessing method, as disclosed by, for example, JP-A(HEI)1-166158, in which management information for virtual resource management of making resources on distributed on computers look like resources on one computer is held on one computer in order to make efficient utilization and management of a large amount of resources, and access to the distributed resources is made using virtual identification means which has the same management structure on all the computers.

In many methods for forming a high-efficiency distributed processing system in a distributed processing environment, there is used a system in which a management table for making unitary management of various resources on computers in the distributed processing environment is prepared and the utilization of the resources is made using information of the management table. In many cases, such unitary information management is especially used in order to realize the transparency (or transmissibility) of the distributed processing environment. More particularly, there is known a system which makes resources distributed on computers in a distributed environment look like resources existing on one computer (see, for example, JP-A-(HEI)1-166158 and JP-A-(HEI)1-166159). In this system, information for unitary management is held in one computer in order to realize a virtual resource management, thereby making it possible to access a remote distributed resource by use of virtual identification means which has the same management structure on all the computers.

However, the above prior art discloses a system which manages a process at each computer or a system which manages resources of the whole of the system in a unified manner at one location. Therefore, the prior art involves a problem wherein no consideration is given to efficient management of a large scale distributed processing system having a large amount of hardware and software distributed over a wide area and a problem that detailed information concerning system construction is required for realization of an efficient processing in the case of a large scale system.

Further, especially, when a user programs the recognition of information concerning individual objects, a precondition is that the user is well aware of the hardware/software construction of the whole system. However, in the case of a wide area and large scale distributed processing system, this precondition itself is very difficult.

The term "object" means an application program, a process, a program module, a file, a database and other resource in a distributed environment, and the processing is generally activated by receiving a message. The processing is advanced with message passing between objects.

SUMMARY OF THE INVENTION

An objective of the present invention is to provide a distributed processing system which allows efficient management of a multiplicity of objects existing in a large scale distributed processing system.

Another objective of the present invention is to provide a distributed processing system which allows efficient utilization of the objects subjected to the efficient management.

A further objective of the present invention is to provide a system which allows the efficient utilization of the objects subjected to the efficient management and in which no load is imposed on a user who structures a distributed processing system.

According to one aspect of the present invention, a system of managing related ones of a large amount of objects in a modularized form is effective in order to achieve the above objective. However, this requires means for making efficient utilization and management of a set of modularized objects. Thus, in the present invention, there is provided an objectification unit for making it possible to handle a set of objects as one object.

According to another aspect of the present invention, a message transfer unit is provided in order that when a message is sent to one object provided by objectification by the objectification unit, processing for the message is effectively performed by requesting the processing of an optimal one of plural objects subjected to objectification or modularization.

According to a further aspect of the present invention, a system of managing every group of related objects of a large amount of objects is effective. Especially, in a large scale network, it is not necessary to make all objects in the network look like objects which exist on one computer. Thus, in the present invention, a limitation is imposed on the transparent (or transmissible) region of an object in a distributed environment. In order to limit the transparent region of an object, assemblies of related objects are provided and a transparency (or transmissibility) limiting unit is provided for making objects untransparent between the assemblies of related objects.

In one example, a communication transfer unit is provided for providing communication between groups of objects subjected to the transparency limitation.

It is preferable that when functions and data possessed by a plurality of objects are utilized, the objectification unit provides an interface which makes it possible to handle those functions and data as a function and data possessed by another object. Accordingly, when a different object desires to utilize the above-mentioned functions or data, the object can utilize the functions or data by merely sending a message to an object provided by objectification to request processing of the same object, that is, by the same method as that in the case where the above-mentioned functions or data are realized by one object from the first.

It is preferable that the message transfer unit stores information concerning the functions or data of the plurality of objects modularized. In order to make efficient utilization of the functions or data of the plurality of modularized objects when a request for processing of the object provided by objectification is made by a message, the message transfer unit refers to the stored information concerning the functions or data to select an object from among the plurality of modularized objects which performs the requested processing and sends a message to the selected object, thereby making it possible to realize the processing with high efficiency.

It is preferable that the transparency limiting unit controls communication between an object in a group of related objects and an object outside the group of related objects. Thereby, communication with no limitations imposed on the transparency of information is ensured between related objects. On the other hand, as for communication for an object outside the group of related objects, an operation/reference associated with that object is indirectly made through the communication transfer unit since the transparency is limited by the transparency limiting unit.

BRIEF DESCRIPTION OF THE DRAWINGS

FIGS. 2A to 2C are diagrams showing a specific construction of the one embodiment of the present invention:

FIGS. 16A and 16B are diagrams showing information in in-world object management databases in the one embodiment of the present invention;

DESCRIPTION OF THE PREFERRED EMBODIMENTS

Embodiments of the present invention will now be explained in detail by use of the drawings.

(1) OUTLINE OF ONE EMBODIMENT OF INVENTION

The outline of one embodiment of the present invention will first be explained. In the present embodiment, an object is one program module. In a computer, the object is executed as one process. The process is the flow of a series of programs executed by a processor. The process is also called a task. In general, an application program is composed of a plurality of function modules. Each function module can be regarded as an object. A processing is performed with a communication or the transmission/reception of message being made between such objects. In a distributed system, a technique is widely used in which an application program is formed by the combination of a client process to request a specified processing and a server-process to perform the requested processing. Each of the client process and the server-process is one object. The details of the object will be mentioned later on.

In an actual distributed processing system, since a plurality of application programs are executed simultaneously, a multiplicity of objects exist in the whole of the distributed processing system. In the distributed processing system, it becomes very important to manage such a multiplicity of objects with high efficiency. Thus, a plurality of related objects are managed in a modularized form. A group of objects modularized is called a world.

Figure 1:
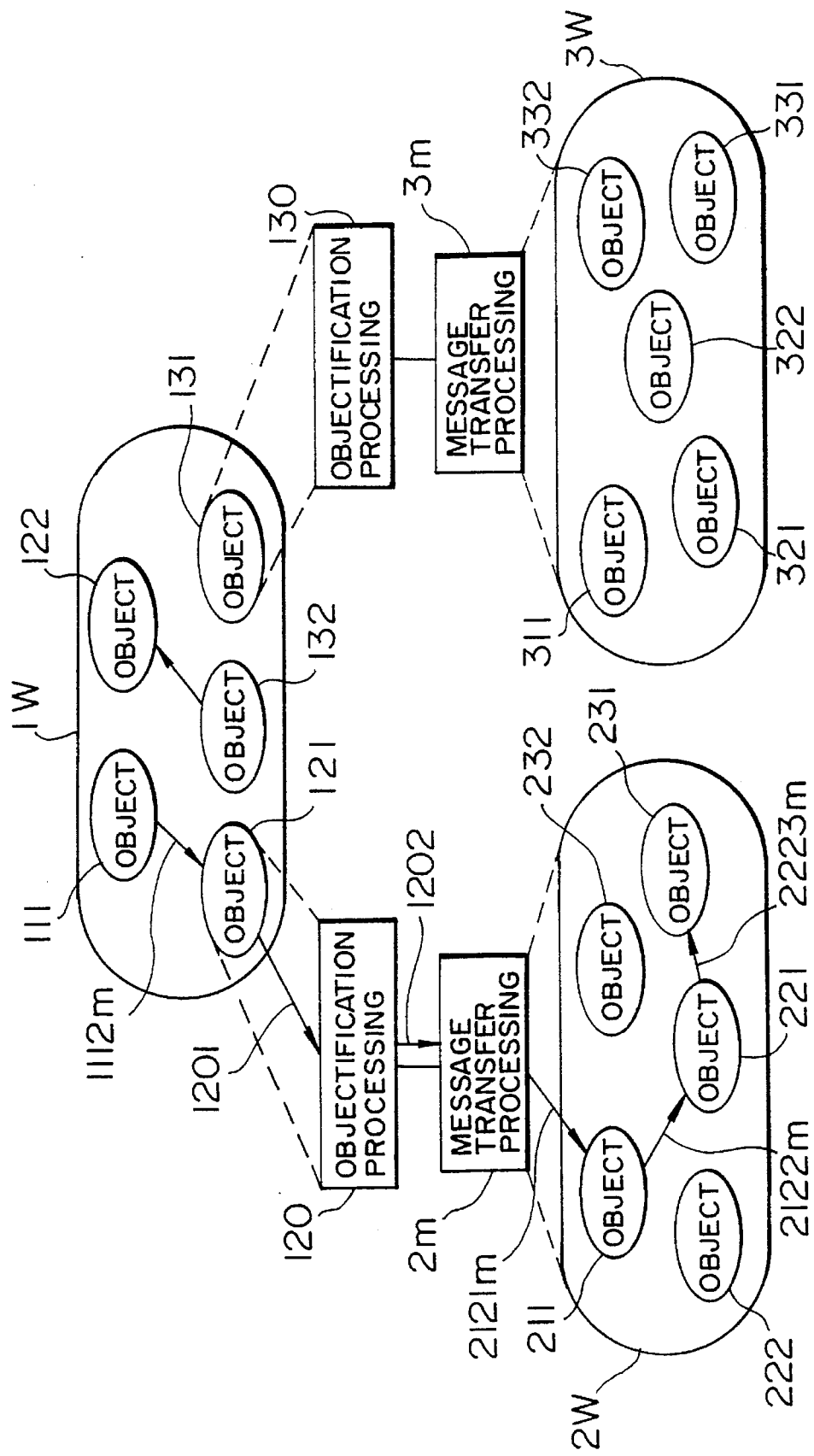
FIG. 1 is a diagram for explaining the outline of one embodiment of a distributed processing system according to the present invention.

FIG. 1 is a conceptual diagram showing the construction of the one embodiment of the present invention. A multiplicity of objects including objects 111, 121, 122, 131, 132, 211, 221, 311, 321, etc. exist in the system. The objects 211, 221, 222, 231 and 232 are modularized as a world 2w, and the objects 311, 321, 322, 331 and 332 are modularized as a world 3w. A direct message communication is made possible only between objects in the same world.

However, if nothing is done, a function possessed by an object in a certain world cannot be utilized by an object outside that world. In order to allow easy and efficient utilization of the function or data of an object in one world by another object, an interface is provided which makes it possible to handle functions possessed by a plurality of objects in a world as if they were one object. In general, however, it is not necessary to provide all of the functions or data of all objects in one world to the outside of that world or it is only required that a part of those functions or data as required can be handled from the exterior. In the present embodiment, a part of functions possessed by the objects in the world 2w is handled as one object 121, and a part of functions possessed by the objects in the world 3w is handled as one object 131. Also, objects 111, 121, 131, 141 and 142 inclusive of the above objects 121 and 131 are modularized as one world 1w.

In the present embodiment, an objectification processing 120 or 130 and a message transfer processing 2m or 3m are provided in order to represent a part of the functions of a plurality of objects in a certain world by one object of another world. The objectification processing is a processing for making a part of functions possessed by objects in a world look like a function possessed by one object, and the message transfer processing is a processing for substantially assigning a job requested from an object outside the world to a specified object in the world. Namely, a message sent to an object representing another world is transferred to the other world through an objectification processing associated with that object and is further transferred by a message transfer processing portion of the other world to a specified object in the other world which in turn processes the message. With such a construction, each object only communicates with objects in a world where that object exists, thereby enabling indirect communication between different worlds to utilize the function of an object of a world other than the world where that object exists.

In the present embodiment, for example, the objectification processing 120 makes only functions B, C and D among functions B, C, D, J, N and P possessed by the objects in the world 2w look like a function possessed by the objects in the world 1w. Accordingly, an object in the world 1w can request a job from the object 121 without making direct communication with an object in the world 2w and while regarding the object 121 itself as possessing the functions B, C and D. Though the requested job is actually performed by one of the objects in the world 2w, the message transfer processing 2m determines one of the objects in the world 2w to which the job is to be assigned. The details of those processings will be mentioned later on.

For example, provided that the object 111 in FIG. 1 requests a job from the object 121 by a message 1112m, a processing for the message is requested to the objectification processing portion 120 (1201) and is further requested therefrom to the message transfer processing portion 2m (1202). The message transfer processing portion 2m requests the processing from, for example, the object 211 by transmitting a message 2121m. The object 211 actually performs the processing. As required, the object 211 performs the requested processing through a plurality of objects in the world 2w, for example, in such a manner that the object 211 transmits a message 2122m to the object 221 and the object 221 transmits a message 2223m to the object 231.

(2) SYSTEM CONSTRUCTION

Figure 2A:
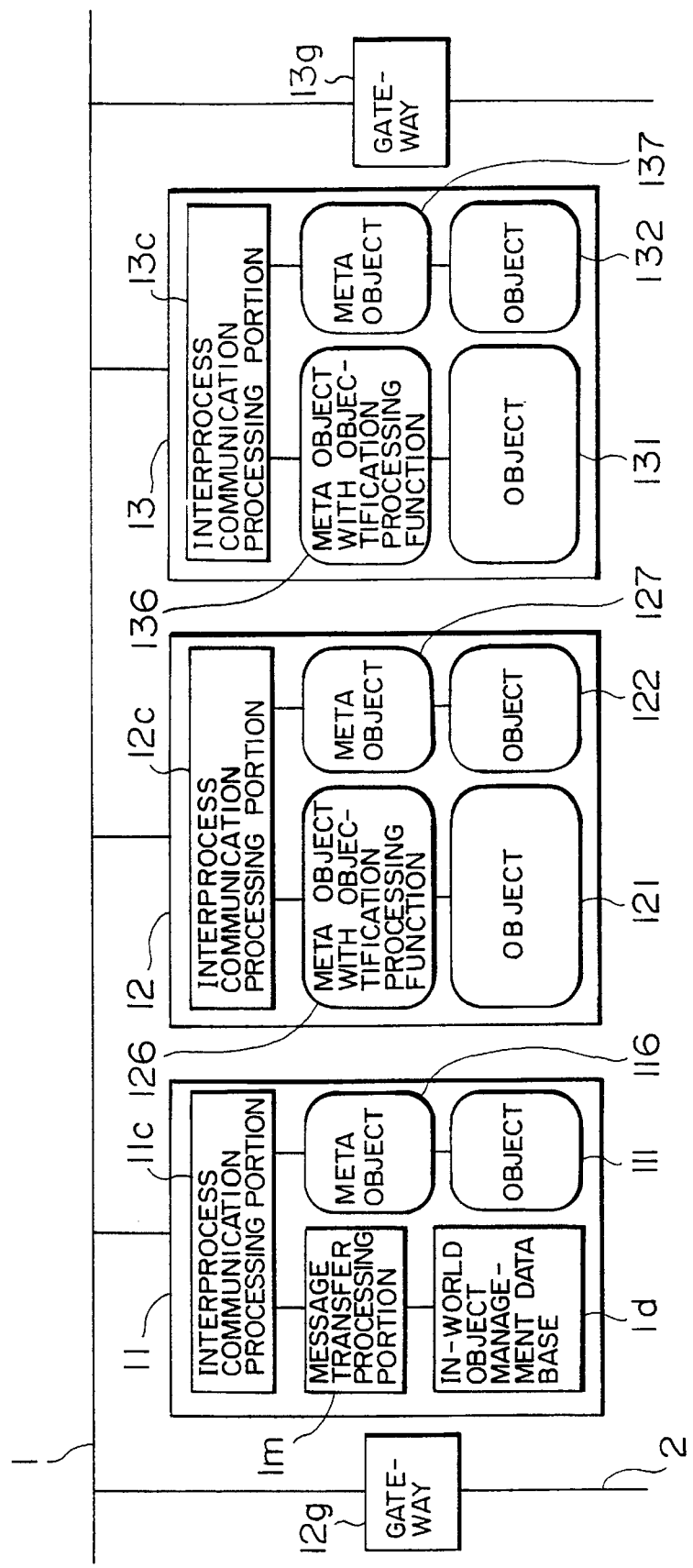

A specific construction of the one embodiment of the present invention will be explained by virtue of FIGS. 2A to 2C. The one embodiment of the present invention is a distributed processing system in which a plurality of networks including a network 1, a network 2 and a network 3 exist. A computer 11, a computer 12 and a computer 13 are connected to the network 1. A computer 21, a computer 22 and a computer 23 are connected to the network 2. A computer 31, a computer 32 and a computer 33 are connected to the network 3. The network 1 and the network 2 are connected by a gateway 12g, and the network 1 and the network 3 are connected by a gateway 13g, thereby allowing a communication over the plurality of networks.

A network number is given to each network, thereby making it possible to uniquely determine one network in the system by designating the network number. Also, a computer number is given to each computer in each network, thereby making it possible to uniquely determine one computer in the network by designating the computer number. The network number and the computer number are combined to form a computer address, thereby making it possible to uniquely determine one computer in the system by designating the computer address. For example, as taught by Internetworking with TCP/IP Principles, Protocols, and Architecture published by Prentce-Hall, Inc. on 1988, a computer address represented by an integer of 32 bits is used in the TCP/IP protocol which is a network communication protocol widely used at the present time.

In the one embodiment of the present invention, the network numbers of the network 1, 2 and 3 are 1, 2 and 3, respectively. Also, for example, the computer 11 is given the computer number 1 and the computer address 11, the computer 12 is given the computer number 2 and the computer address 12, and the computer 21 is given the computer number 1 and the computer address 21. The same holds for the computer numbers and the computer addresses of the other computers.

Each computer has a multiprocessing function which makes it possible to perform a plurality of processes simultaneously. Accordingly, a plurality of objects concurrently exist on one computer and can operate in parallel. For example, as disclosed by The Design and Implementation of the 4.3 BSD UNIX Operation System published by Addison-Wesley Publish Company on 1989, a UNIX operating system widely used at the present time (UNIX being an operating system developed by the AT&T Bell Laboratory) possesses a multiprocessing function, and it is possible to perform a plurality of processes simultaneously on one computer by utilizing the UNIX operating system.

Each computer includes one interprocess communication processing portion. In the present embodiment, the computer 11 includes an interprocess communication processing portion 11c, the computer 12 includes an interprocess communication processing portion 12c, and the computer 21 includes an interprocess communication processing portion 21c. Similarly, the other computers include interprocess communication processing portions. The interprocess communication processing portion enables a message communication between processes.

A communication between processes is made using a port. A plurality of ports are prepared in each computer and a port number is given to each port. In one computer, a port can be determined uniquely by designating the port number. For example, as disclosed by The Design and Implementation of the 4.3 BSD UNIX Operation System (1989), the UNIX operating system provides an interprocess communication function called a socket. In the present embodiment, a port is designated by a port number represented by an integer of 16 bits (or 2 bytes).

In the present embodiment, the interprocess communication processing portion utilizes a socket. In the socket, interprocess communication is made possible by designating a socket address. The socket address is composed of an address family number, a port number and a computer address. The address family number is an integer of 16 bits (or 2 bytes) representing the type of address. In the present embodiment, however, only one type of address is used and hence the address family number is always the same. Accordingly, the interprocess communication is made possible by designating only the computer address and the port number.

Each computer includes an object. For example, the computer 11 includes an object 111, the computer 12 includes objects 121 and 122, the computer 13 includes objects 131 and 132, the computer 21 includes an object 211, and the computer 22 includes objects 221 and 222. Similarly, the other computers include objects.

One meta object exists for each object. The meta object is a program module which has a function of managing the associated object. In the present embodiment, the meta object mainly performs communication management, that is, processing relevant to the transmission/reception of message. For example, a meta object 116 exists for the object 111, and a meta object 216 exists for the object 211. The meta object 116 or 216 is associated with the object 111 or 211. However, an object representing another world is provided with a meta object with objectification processing function in which a function of performing an objectification processing is added to a usual meta object. In the present embodiment, therefore, the objectification processing shown in FIG. 1 is performed by the meta object with objectification processing function. For example, the computer 12 includes a meta object 126 with objectification processing function associated with the object 121, and the computer 13 includes a meta object 136 with objectification processing function associated with the object 131. The objectification processing 120 shown in FIG. 1 is performed by the meta object 126 with objectification processing function, and the objectification processing 130 is performed by the meta object 136 with objectification processing function.

In the present embodiment, one object is executed in one process and a meta object is included in the process of one object. Accordingly, an object and a meta object associated therewith exist on the same computer.

In the present one embodiment of the present invention, a modularized form of a plurality of objects is called a world. Namely, the world shows a range where a plurality of related objects exists. A plurality of worlds can exist in the system. A world name is given to each world. A direct communication is possible only between objects in the same world. An object name is given to each object. An object can be uniquely determined in one world by designating the object name.

In the present embodiment of the present invention, it is assumed that objects existing in computers connected to one network belongs to one world. Namely, the objects existing in the computers connected to the network 1 belong to the world 1w, the objects existing in the computers connected to the network 2 belong to the world 2w, and the objects existing in the computers connected to the network 3 belong to the world 3w. Namely, the objects 111, 121, 122, 131 and 132 belong to the world 1w, the objects 211, 221, 222, 231 and 232 belong to the world 2w, and the objects 311, 321, 322, 331 and 332 belong to the world 3w.

One message transfer processing portion and one in-world object management database exist for each world. Namely, one of the computers connected to each network includes the message transfer processing portion and the in-world object management database. In the present embodiment, the computer 11 connected to the network 1 includes a message transfer processing portion 1m and an in-world object management data base 1d; the computer 21 connected to the network 2 includes a message transfer processing portion 2m and an in-world object management database 2d; and the computer 31 connected to the network 3 includes a message transfer processing portion 3m and an in-world object management database 3d.

In the present embodiment, a message transfer processing by the message transfer processing portion is described by a program and one message transfer processing portion is executed by one process. The in world object management database is a file. In the file is stored information concerning the object names of objects which exist in the corresponding world, computer addresses at which the objects exist, the port numbers of ports which are connected to meta objects associated with the objects, messages which are acceptable to the objects, and functions which are possessed by the objects. The message transfer processing portion can perform the transfer of a message between objects by reading the information stored in the in-world object management database.

In order to represent the functions of a plurality of objects in one world by an object of another world, it is necessary to associate the message transfer processing portions and the meta objects with objectification processing function with each other. Thus, a message transfer processing portion and a meta object with objectification processing function are associated such that each one stores a computer address and a port number at which the other exists, and interprocess communication is made between the associated message transfer processing portion and meta object with objectification processing function. In the present embodiment, a fixed port number, for example, a port number of 100, is given to the message transfer processing portion. Thereby, for example, a transmit message addressed to the object 121 is sent to the message transfer processing portion 2m by the meta object 126 with objectification processing function. The message transfer processing portion 2m reads information stored in the in-world object management database 2d concerning the objects in the corresponding world to determine a proper addressee object to which the message is to be transmitted, and transfers the message to the determined object. Accordingly, the function of an object belonging to another world can be utilized without making direct communication between objects which belongs to different worlds.

Figure 3:
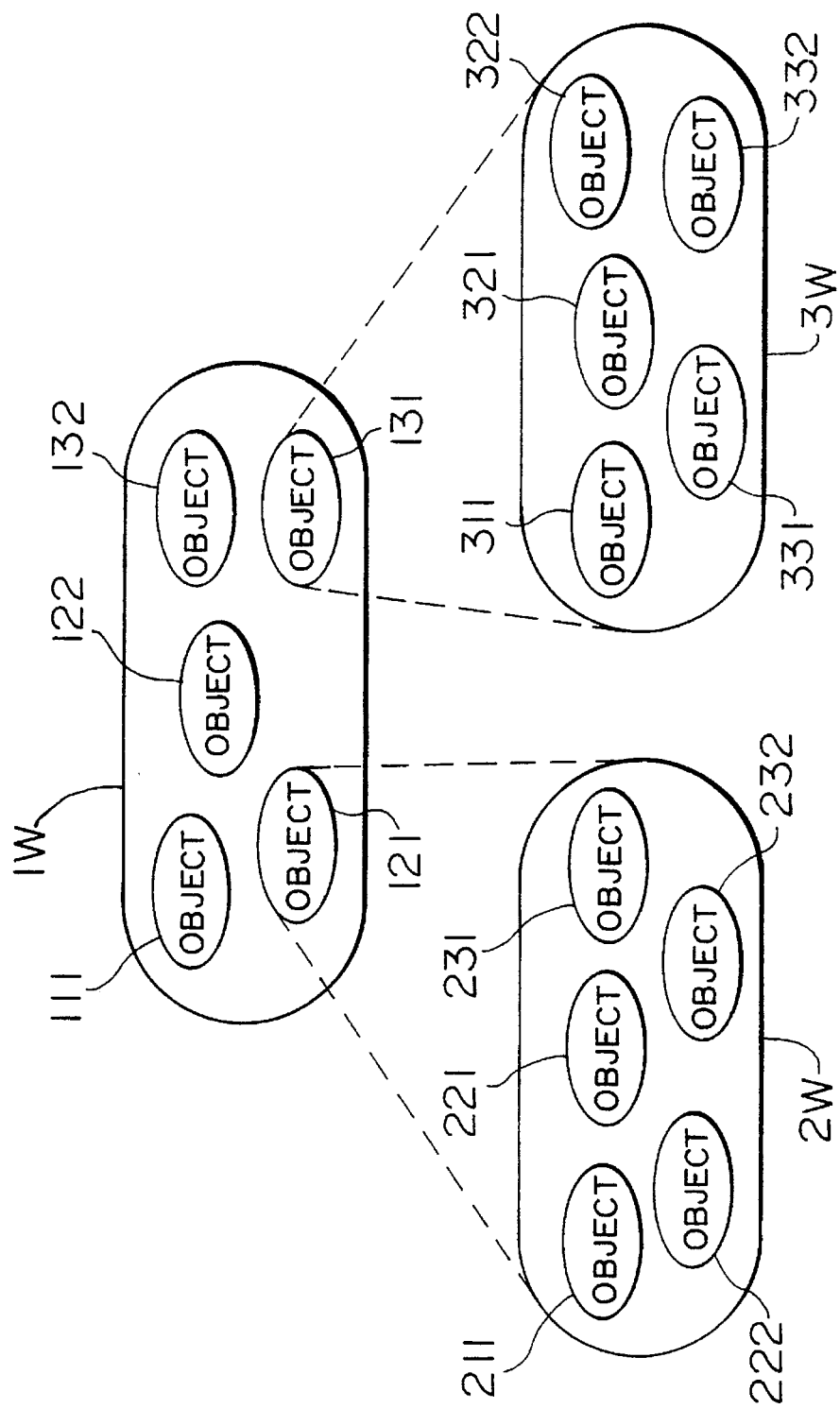
FIG. 3 is a diagram showing the construction of objects and worlds in the one embodiment of the present invention.

A relationship between worlds and objects in the present embodiment is shown in FIG. 3. Since it is not required that the object itself be conscious of the objectification processing, the message transfer processing and so on, the relationship can be represented by only the worlds and the objects, as shown in FIG. 3. A part of functions realized by the objects 211, 221, 222, 231 and 241 in the world 2w is represented by the object 121 in the world 1w. Similarly, a part of functions realized by the plural objects in the world 3w is represented by the object 131 in the world 1w. In such a relationship between worlds, the world 1w will be called a superordinate world to the world 2w. Conversely, the world 2w will be called a subordinate world to the world 1w.

(3) OBJECT

Figure 4:
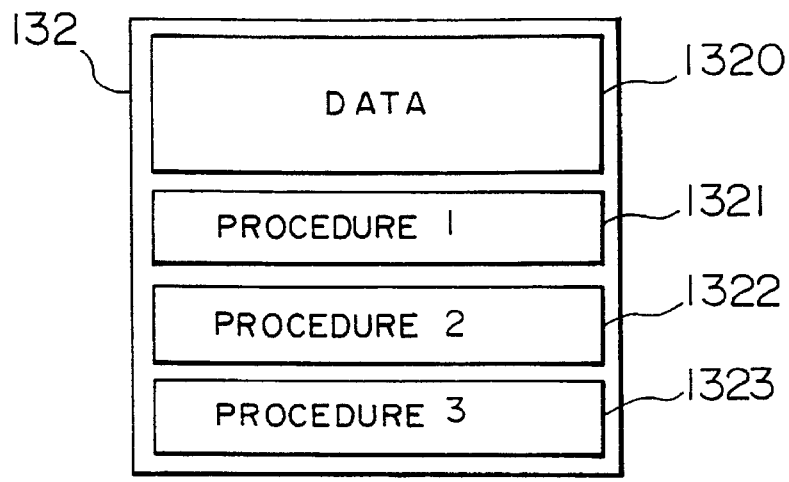
FIG. 4 is a diagram showing the program structure of an object in the one embodiment of the present invention.

An object in the one embodiment of the present invention is a program which is activated upon reception of a message to perform a processing. In general, the object is a set of data and procedures related thereto. For example, as shown in FIG. 4, the object 132 includes data and programs of procedures 1, 2 and 3. For each procedure a message name of a receive message for activating a processing for that procedure is defined. For example, the definition is made such that the procedure 1 is activated when a message having a message name of "message e" is received, the procedure 2 is activated when a message having a message name of "message f" is received, and the procedure 3 is activated when a message having a message name of "message h" is received.

However, in the case of an object associated with a meta object with objectification processing function, a processing corresponding to a receive message is performed by an objectification processing of the meta object with objectification processing function even if any specified procedure is not defined. The details of this operation will be mentioned later on.

A message is means for exchanging information between objects. In the present embodiment, since a meta object has a communication management function, a communication between objects is performed in such a manner that an object requests the transmission/reception of a message to a meta object.

Figure 5:
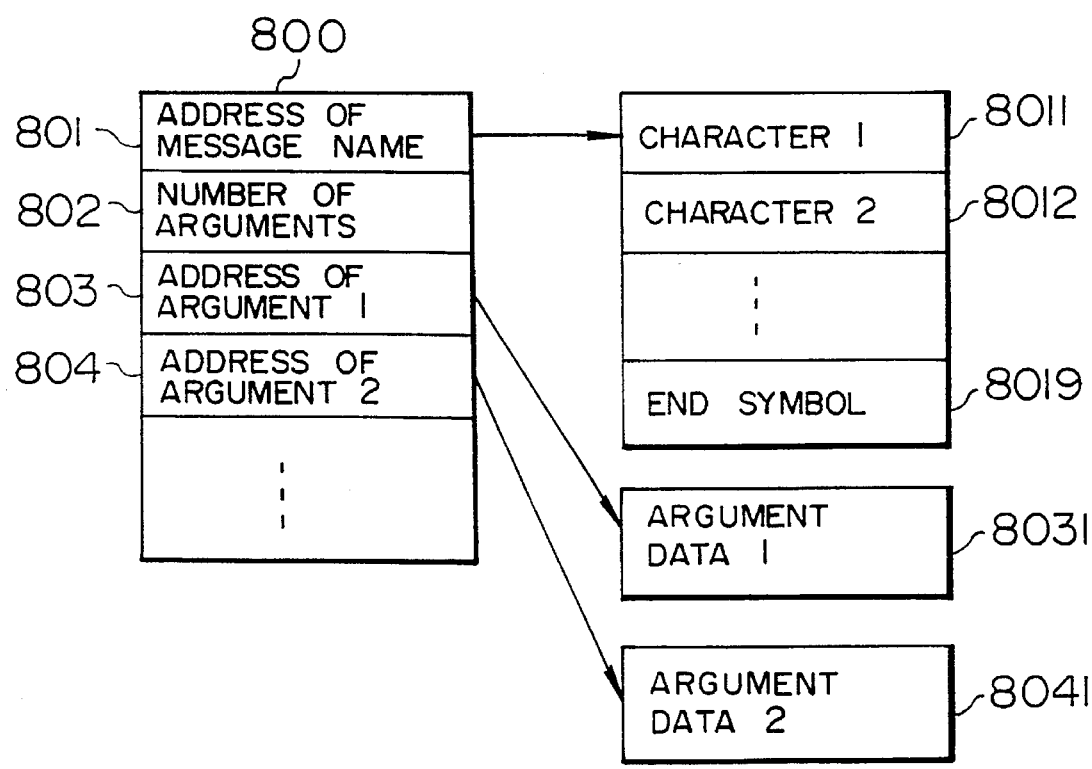
FIG. 5 is a diagram showing the structure of a message handled by the object in the one embodiment of the present invention.

A message handled by an object is composed of only a message name or a message name and one or more argument data. The data format of a message actually handled by an object is shown in FIG. 5. A message 800 is composed of a memory address 801 at which a character string representative of a message name is stored, data 802 which represents the number of arguments, and memory addresses 803, 804, ... at which argument data are stored, respectively. The character string of the message name is represented by a list of character codes, as designated by 8011, 8012. The actual data of arguments are stored, as designated by 8031, 8041, in accordance with their data types. The data types of arguments are defined by programs of a transmitting object and a receiving object so that they are consistent between both objects for each message. Similarly, the presence/absence of answer and the data type of answer are defined beforehand. An answer is stored at an address indicated by the argument of a message. Information concerning the number of and the data types of arguments of a message and the presence/absence of and the data type of answer is also stored in a meta object associated with an object which transmits or receives the message. The stored information is used in a message transmit/receive processing of the meta object.

Figure 6:
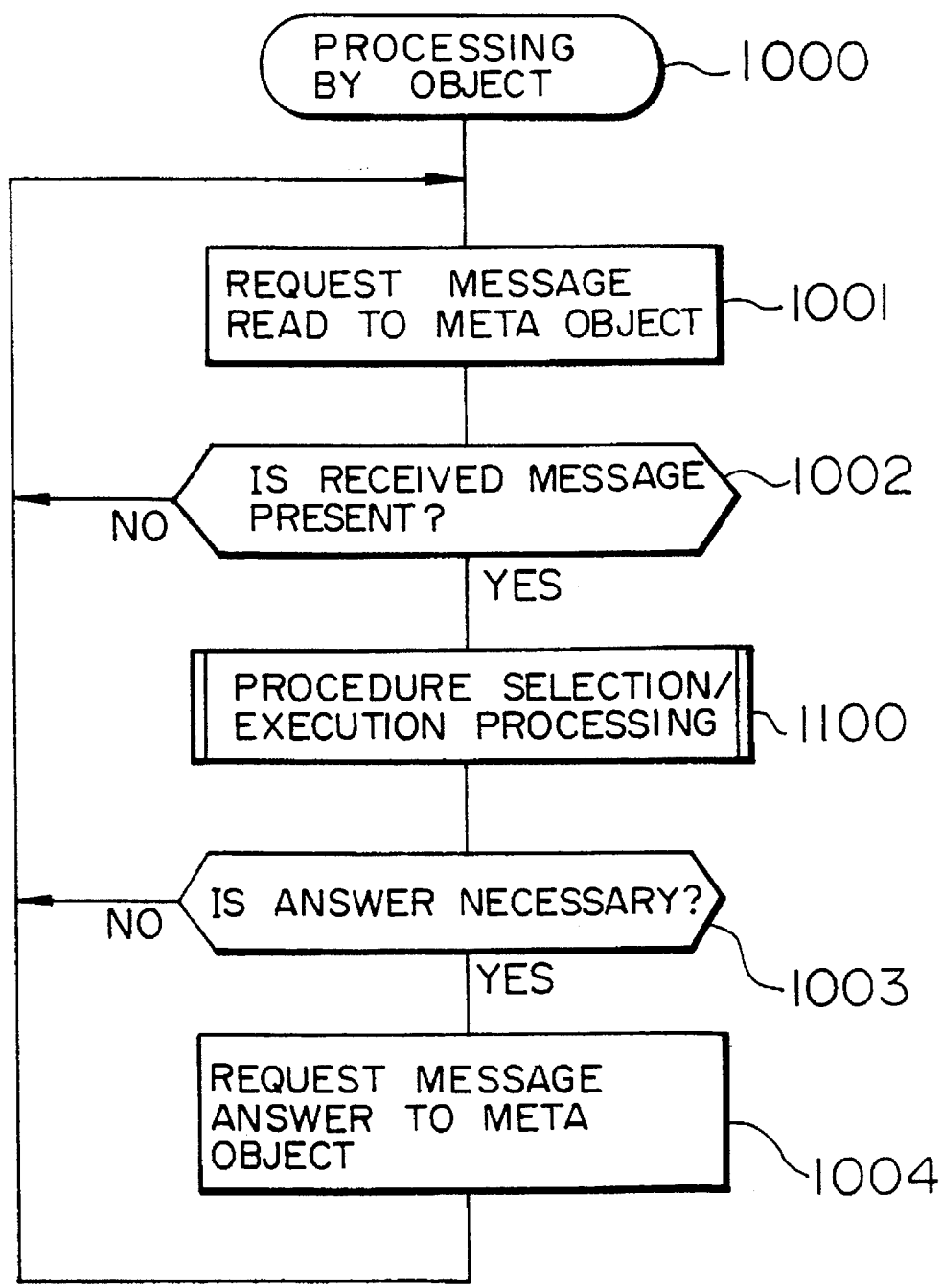
FIG. 6 is a chart showing a processing performed by the object in the one embodiment of the present invention.

The operation of an object will be explained using FIG. 6. First, the object requests a meta object for the read of a message addressed to that object (step 1001). This is performed by calling a procedure in a program of the meta object. The operation of the meta object for the message read request will be mentioned later on. If a message received by the meta object is present, the object can receive the message as data having a format shown in FIG. 5. The message read request to the meta object is repeated if no received message is obtained, and the flow proceeds to the next processing if a received message is obtained (step 1002). Next, the object performs a procedure selection/execution processing for the received message (step 1002). If an answer is necessary (step 1003), a message answer request is made to the meta object (step 1004). The message answer request can be made by calling a procedure in the meta object.

Figure 7:
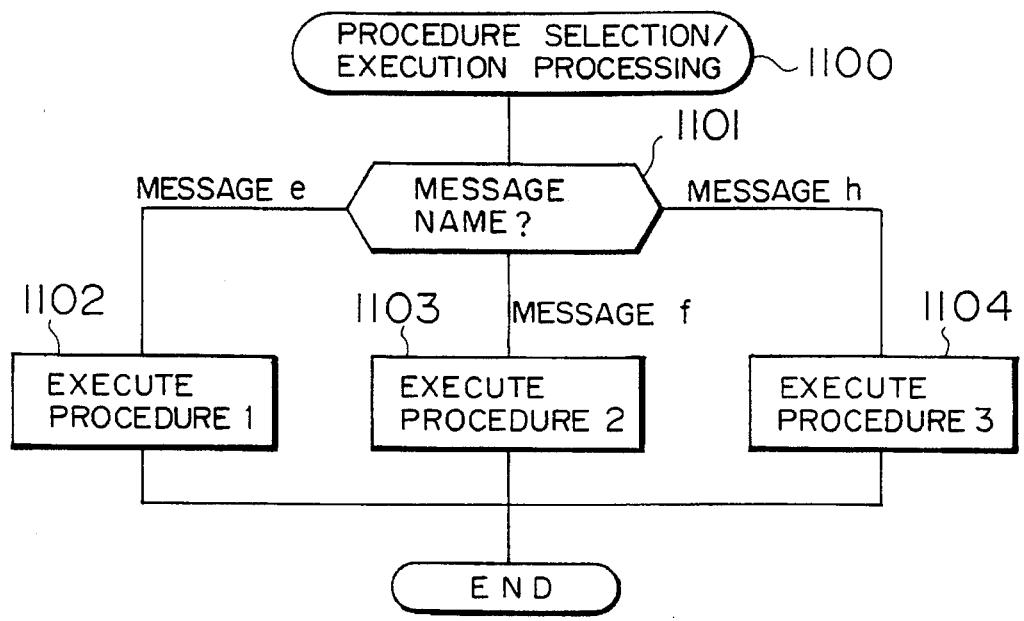
FIG. 7 is a chart showing a procedure selection/execution processing performed by the object in the one embodiment of the present invention.

Next, the procedure selection/execution processing for the received message will be explained using FIG. 7. FIG. 7 shows an example for the object 132 shown in FIG. 4. First, a message name of the received message is judged (step 1101). If the message name is "message e", the procedure 1 is performed (step 1102). If the message name is "message f", the procedure 2 is performed (step 1103). If the message name is "message h", the procedure 3 is performed (step 1104). The argument of the message is used by a processing for a procedure to be performed. In the case where there is received a message having a message name for which no corresponding procedure exists, no processing is performed with the message being ignored.

Objects can perform processings in parallel while passing a message through an inter-object communication. In a program of a procedure, an object can transmit a message to another object, as required. The message can be transmitted by generating message data having a format shown in FIG. 5 and making a request to a meta object associated with that object for message transmission. The message transmission request is made by calling a procedure in the meta object.

In the present embodiment, there are provided a plurality of different message transmission systems, that is, object address designated transmission, object name designated transmission, transmission with addressee (or receiver) judgement information, and broadcasting transmission. The object address designated transmission is a system in which the transmission is made with the designation of both a computer address at which an addressee (or receiver) object exists and the port name of a port to which the addressee object is connected, in the case where they are known. The object name designated transmission is a system in which the transmission is made with the designation of the object name of an addressee object. The object name designated transmission is used when the object name of the addressee object is known but a computer address and a port name for the addressee are unknown. The transmission with addressee judgement information is a system in which the transmission is made in such a manner that a function name of a procedure to be performed by an object to receive a message is provided as addressee judgement information which is used in determining an addressee. The transmission with addressee judgement information is used in the case where an object name, a computer address and a port name are not known but only a function name is known. In this case, a message name may be unknown. For a message transmitted through the transmission with addressee judgement information, an addressee and a message name are determined by a message transfer unit. The details will be mentioned later on. The broadcasting transmission is used especially in the case where a message is transmitted to all objects in a world without designating an addressee. The type of transmission system to be used is designated when message transmission is requested to a meta object.

A message may be provided with a priority. The priority can be provided with integer numbers of, for example, 0 to 256. It is assumed that the priority becomes higher as the priority number becomes smaller. In the case where a plurality of messages are received by an object, the object successively perform processings corresponding to those messages in the order of priority from a higher priority. A processing for the priority is performed by a meta object and this will be mentioned later

(4) META OBJECT

Figure 8:
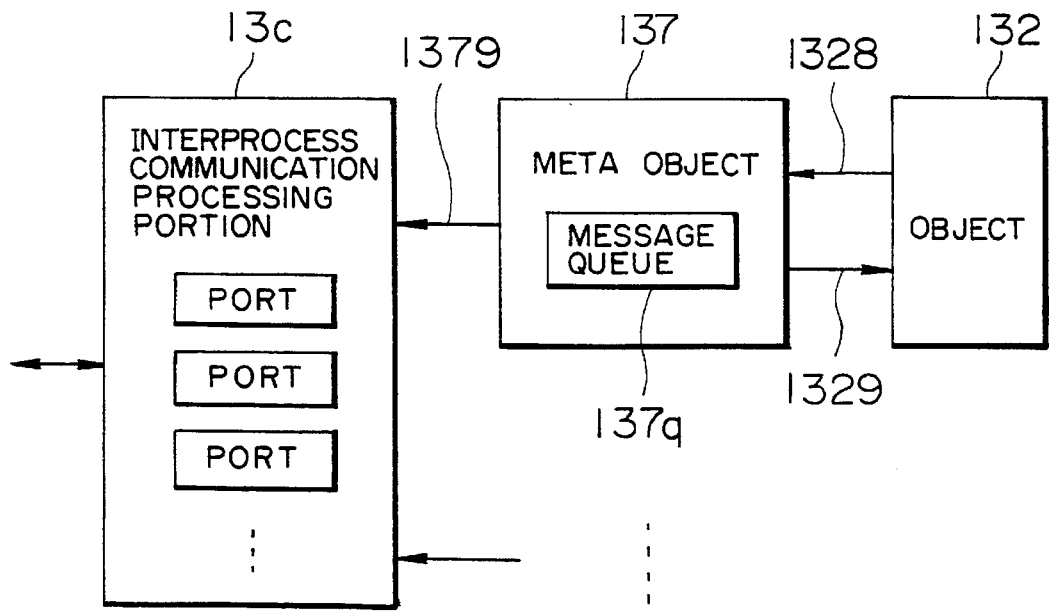
FIG. 8 is a diagram showing a relationship between a meta object, an object and an interprocess communication unit in the one embodiment of the present invention.

A relationship between a meta object and an object and an interprocess communication portion is shown in FIG. 8. A meta object 137 is connected to an object 132 and an interprocess communication processing portion 13c. The meta object 137 has a message queue 137q in which messages addressed to the object 132 are stored in accordance with the priority.

The meta object 137 receives a request (1328) from the object 132 for message read from the message queue 137q, message transmission, message answer or the like to perform a processing. Also, the meta object 137 makes a request (1379) to the interprocess communication processing portion 13c a for message read from port, message transmission or the like. As required, the meta object 137 can perform a processing (1329) for the object 132 which includes rewriting of data or procedure in the object 132.

Figure 9:
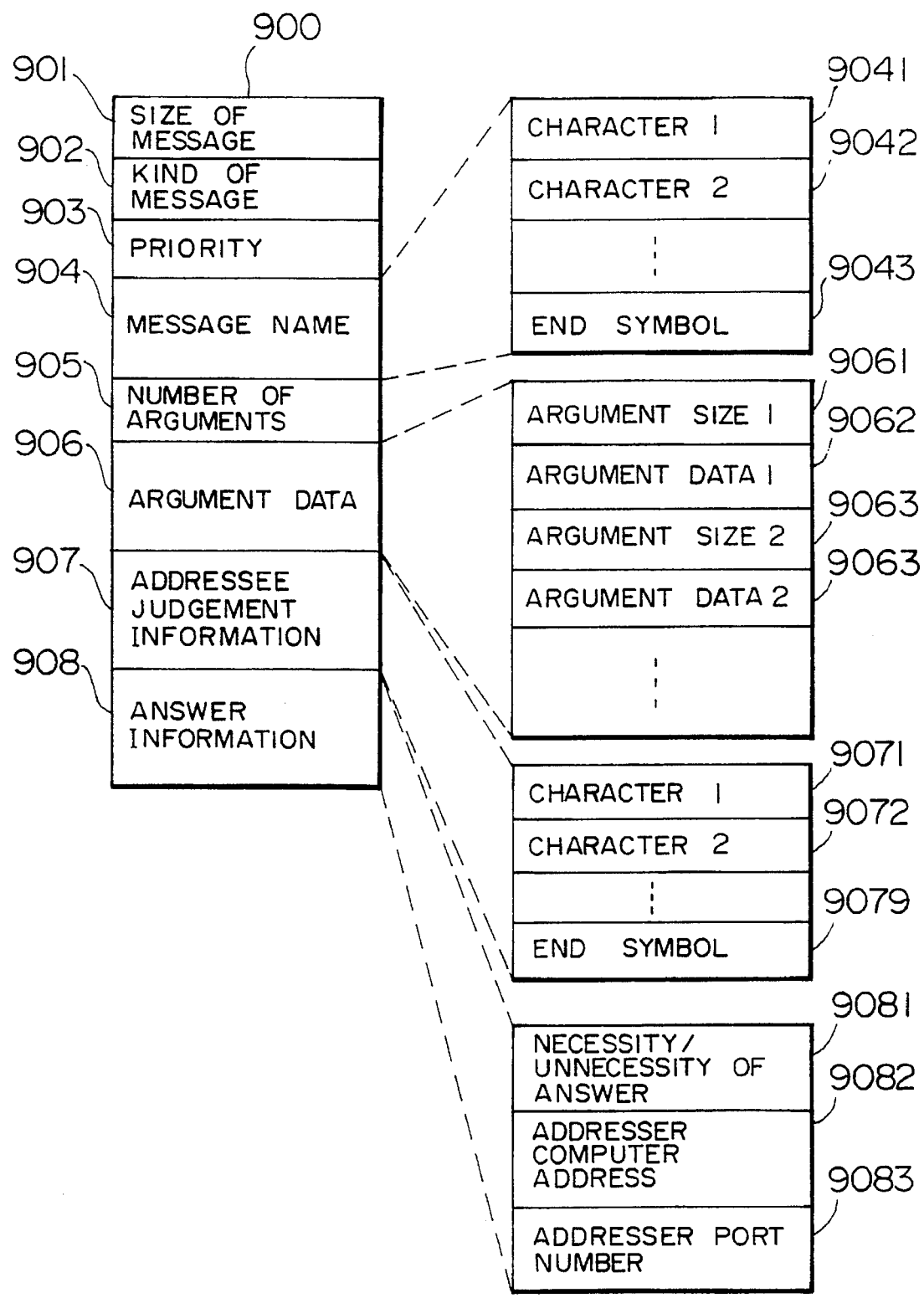
FIG. 9 is a diagram showing the structure of a message handled by the interprocess communication unit in one embodiment of the present invention.

As has been mentioned, a message handled by an object has a format shown in FIG. 5 and the object and a meta object perform message transmission/reception in accordance with this format. On the other hand, the format of a message handled by an interprocess communication processing portion is as shown in FIG. 9. Namely, a message 900 is composed of data 901 representative of the size (or the number of bytes) of the whole of message, data 902 representative of the kind of the message, a priority 903, a message name 904, data 905 representative of the number of arguments, argument data 906, addressee judgement information 907, and answer information 908. The kind of message indicates a message based on the object address designated transmission, a message based on the object name designated transmission, a message based on the transmission with addressee judgement information, a message based on the broadcasting transmission, or an answer message.

The message name includes a list of character codes (as designated by 9041, 9042, . . . ) representative of a character string of the message name. The last of the list of character codes is provided with an end symbol. As for the argument data, a combination of the size (or the number of bytes) of data and the data itself is prepared for each argument. The argument data includes a list of such combinations for all of arguments, that is, the size 9061 of the 1st argument, the 1st argument data 9062, the size 9063 of the 2nd argument, the 2nd argument data 9063, and so on. In the case of an answer message, answer data is sent as argument data. The addressee judgement information includes a character string representative of a function name or a list of character codes as designated by 9071, 9072, . . . . The answer information includes data 9081 representative of whether or not an answer to the corresponding message is necessary, and a computer address 9082 and a port number 9083 of a message addresser, that is, an answeree to which an answer to the corresponding message is to be sent.

Figure 10:
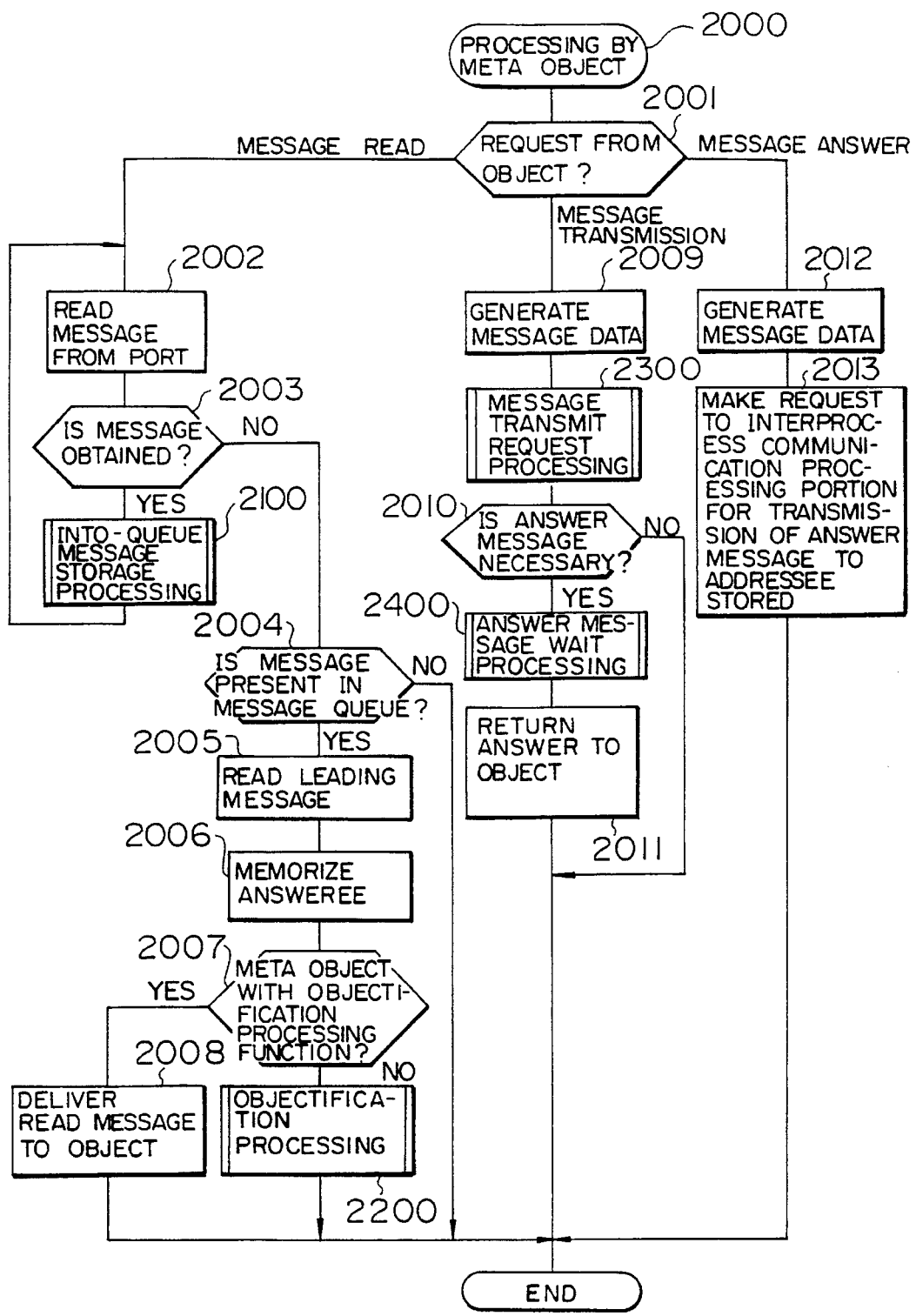
FIG. 10 is a chart showing a processing performed by the meta object in the one embodiment of the present invention.

A processing by a meta object is activated by a request from an object and the details thereof will be explained using FIG. 10. The processing differs depending on the request from the object (step 2001). In the case where the request from the object is a request for message reading from a message queue, message read from port is requested from an interprocess communication processing portion and is performed (step 2002). Since the interprocess communication processing portion is realized by a function of an operating system, the request from the meta object is realized by invoking a system call of the operating system. Messages are fetched one by one. If a message exists at a port (step 2003), a message storage processing 2100 for storing the message into the message queue is performed and thereafter the flow returns to the processing 2002. If no message exists at the port, the examination is made as to whether or not a message exists in the message queue (step 2004). If no message exists in the message queue, the processing is completed. If a message exists in the message queue, a leading message in the message queue is read (step 2005). If the read message requires an answer, a computer address and a port number of a message addresser or answeree in the answer information of that message are stored (step 2006). If the meta object under consideration is a usual meta object, the read message is delivered to the object after it has been converted from a format shown in FIG. 9 into a format shown in FIG. 5 (step 2008). Thereby, the processing is completed. If the meta object is a meta object with objectification processing function, a objectification processing 2200 is performed, thereby completing the processing.

In the case where the request from the object is for message transmission, the meta object generates message data with a format of FIG. 9 on the basis of the data with a format of FIG. 5 received from the object (step 2009) and performs a message transmit request processing 2300. If an answer message to a message to be transmitted is not necessary (step 2010), the processing is completed. If the answer message is necessary (step 2010), the flow proceeds to the next processing. Namely, a wait for the answer message is taken (step 2400) and an answer obtained is returned to the object (step 2011).

In the case where the request from the object is for an answer to the message, the meta object generates answer message data having a format shown in FIG. 9 (step 2012) and requests the transmission of an answer message for the stored computer address and port number of the answeree to the interprocess communication processing portion (step 2013).

Next, the message queuing processing 2100, the objectification processing 2200, the message transmit request processing 2300 and the answer message wait processing 2400 among the above-mentioned processings will be explained in detail.

Figures 11, 12:
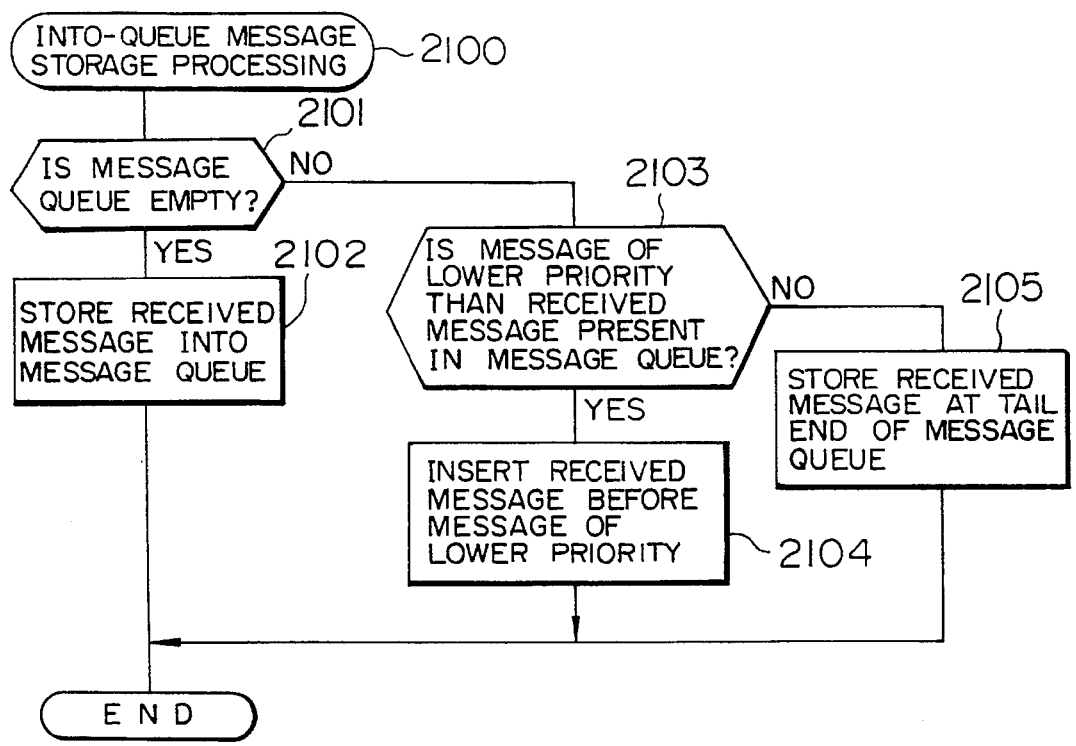
FIG. 11 is a chart showing an message queuing processing performed by the meta object in the one embodiment of the present invention.
FIG. 12 is a diagram showing processable message information stored by a meta object with objectification processing function in the one embodiment of the present invention.

FIG. 11 shows the message storage processing 2100 for a received message. First, the examination is made as to whether or not the message queue is empty (step 2101). In the case where the message queue is empty, the received message is stored into the message queue (step 2102). In the case where the message queue is not empty, the examination is made as to whether or not a message having a lower priority than the received message exists in the message queue (step 2103). If the message having the lower priority exists, the received message is inserted before the message having the lower priority (step 2104). If the message having the lower priority does not exist, the received message is stored at the tail end of the message queue (step 2105). By the above processing, messages in the message queue are arranged in descending order of priority. In the case where messages have the same priority, the message received earlier is positioned before the other message.

Next, the objectification processing 2200 will be explained. This processing is performed only in the case of a meta object with objectification processing function. A meta object with objectification processing function has processable message information stored therein and refers to this information to perform an objectification processing. FIG. 12 shows an example of processable message information stored in the meta object 126 with objectification processing function. The example shows that messages having message names of "message b", "message c" and "message d" are processable and can realize functions B, C and D, respectively. Accordingly, an object in the world 1w can request a job to the object 121 connected to the meta object 126 with objectification processing function by transmitting a message to the object 121, regarding the object 121 itself as having the functions B, C and D.

In the meta object with objectification processing function is stored a computer address of a message transfer processing portion associated therewith and the meta object with objectification processing function can make a request to an interprocess communication processing portion connected to the meta object to transfer a message to the associated message transfer processing portion.

Figure 13:
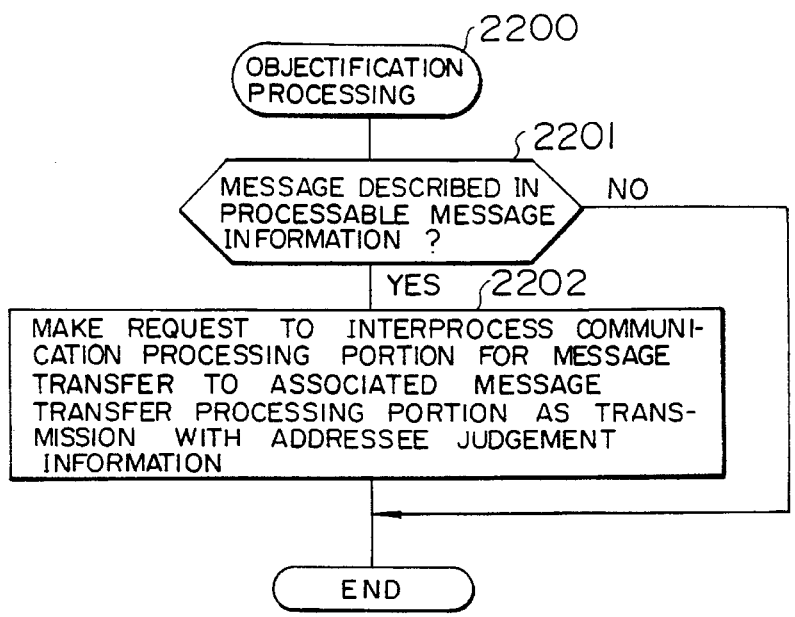
FIG. 13 is a chart showing an objectification processing performed by the meta object with objectification processing function in the one embodiment of the present invention.

An objectification processing for a message read from a message queue will be explained using FIG. 13. First, the examination is made as to whether or not a message name of the read message is a message name described in the processable message information (step 2201). When the case is not so, no processing is performed for the read message and the processing is completed. When the case is so, a function name corresponding to the message name is written as addressee judgement information into message data read (see FIG. 9) and the transmission of that message is requested as transmission with addressee judgement information to the interprocess communication processing portion with the designation of a computer address and a port number of the associated message transfer processing portion (step 2202).

For example, in the case where "message b" addressed to the object 121 arrives, the message is transferred to the message transfer processing portion 2m after the function B has been attached as message addressee judgement information to the message. Similarly, in the case where "message d" arrives, the message is transferred with the function D being attached as addressee judgement information. As will be mentioned later on, the message transfer processing portion 2m transfers the message to an object in the world 2w which realizes the function.

Figure 14:
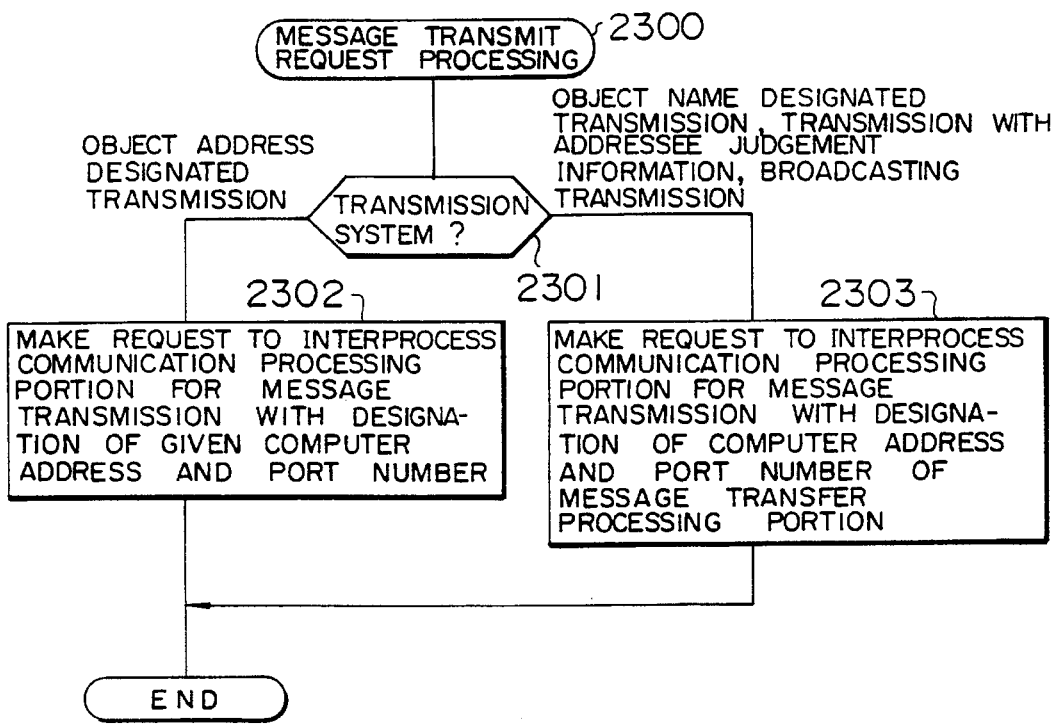
FIG. 14 is a chart showing a message transmission request processing performed by the meta object in the one embodiment of the present invention.

Next, the message transmission request processing 2300 will be explained using FIG. 14. In this case, a processing differs depending on a message transmission system (step 2301). In the case of the object address designated transmission, message transmission is requested from an interprocess communication unit with the designation of a computer address and a port number given (step 2302). In the case of the object name designated transmission, the transmission with addressee judgement information or the broadcasting transmission, message transmission is requested from the interprocess communication unit with the designation of a computer address and a port number of a message transfer processing portion in a world to which an object associated with a meta object under processing belongs, that is, a message transfer processing portion in a network connected to a computer in which the meta object exists (step 2303). Namely, in this case, since a computer address and a port number of a message addressee are unknown, a message is transmitted to the message transfer processing portion once to make a request to the message transfer processing portion for message transfer to an addressee object.

Figure 15:
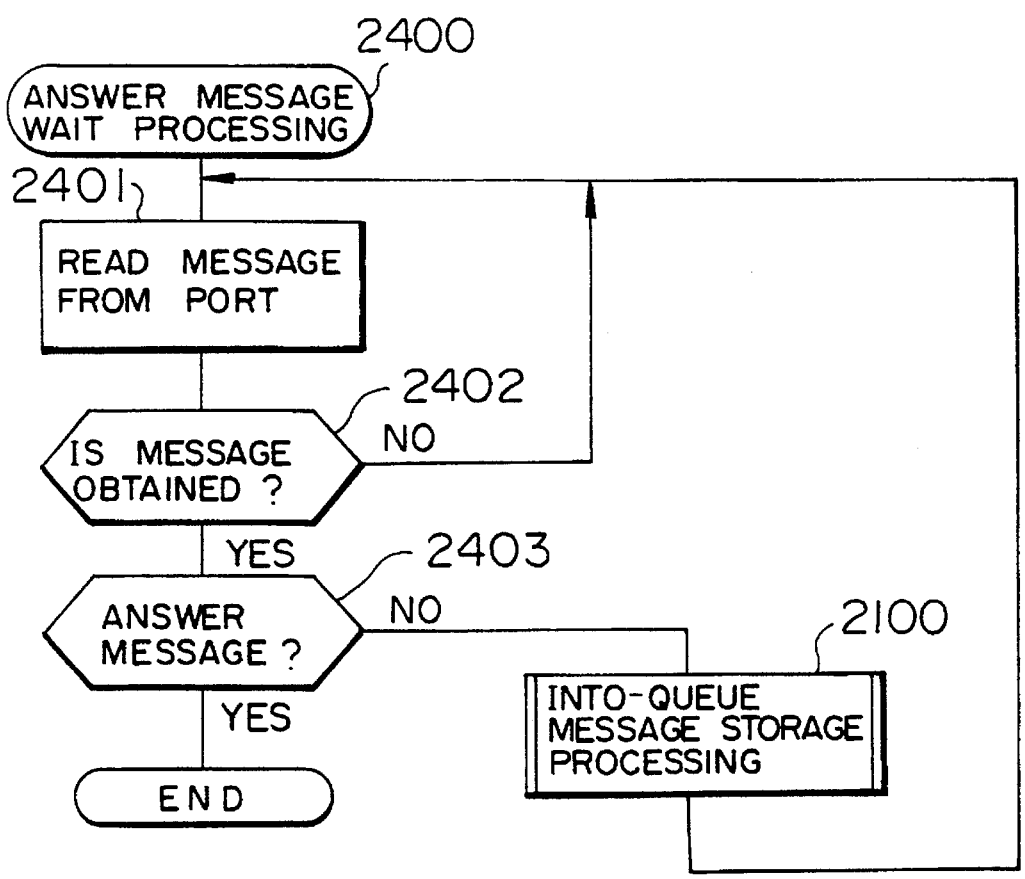
FIG. 15 is a chart showing an answer message wait processing performed by the meta object in the one embodiment of the present invention.

The answer message wait processing 2400 will be explained using FIG. 15. First, a message read from a port is requested from an interprocess communication processing portion and is performed (step 2401). In the case where a message exists in a port (step 2402), the flow proceeds to the next processing. In the case where no message exists in a port (step 2402), the flow returns to the processing 2401. If a message is obtained, the examination is made as to whether or not the message is an answer message (step 2403). In the case where the obtained message is an answer message, the processing is completed. In the case where the obtained message is not an answer message, a message storage processing 2100 for storing the obtained message into a message queue is performed and thereafter the flow returns to the processing 2401 again.

As mentioned above, a meta object mainly makes the execution and management of a message transmit/receive processing, thereby enabling the handling of messages having a priority. Also, a meta object with objectification processing function performs an objectification processing allows an object connected to the meta object to behave itself like an object having the function of an object which exists in another world.

(5) MESSAGE TRANSFER PROCESSING PORTION

A message transfer processing portion in the present embodiment, when receiving a message to the message transfer processing portion, reads information stored in an in-world object management database to determine an object to which the message is to be transferred, and transfers the message with a computer address and a port number of the determined transferee object being designated.

Examples of in-world object management data bases are shown in FIGS. 16A and 16B. An in-world object management data base provided for each world has object names, computer addresses, port numbers, acceptable message names and function names stored therein in connection with all objects which exist in that world. For example the contents stored in connection with the object 111 are such that the object 111 exists in a computer at a computer address of 11, is connected to a port having a port number of 101, can receive a message having a message name of "message a", and performs a procedure having a function having a function name of "function A" when that message is received. Also, the contents stored in connection with the object 132 are such that the object 132 exists in a computer at a computer address of 13, is connected to a port having a port number of 102, can receive messages having message names of "message e", "message f" and "message h", and performs procedures of functions I, K and H when the "message e", "message f" and "message h" are received, respectively. The object 121 represents a part of functions possessed by objects in the world 2w. It is seen from FIGS. 16A and 16B that the object 121 represents functions B, C and D of the functions possessed by the objects in the world 2w.

Figure 17:
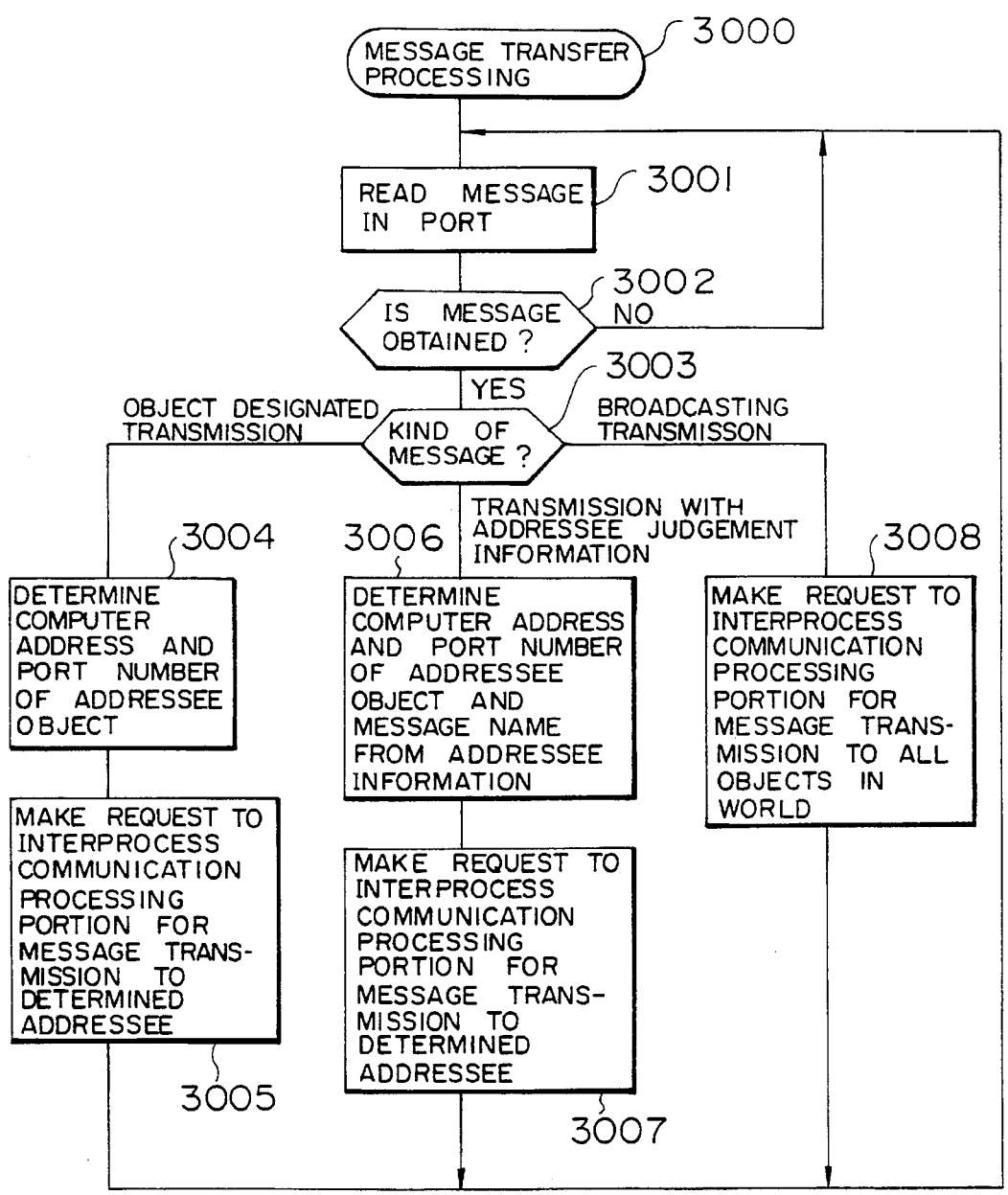
FIG. 17 is a chart showing a processing performed by a message transfer unit in the one embodiment of the present invention.

The operation of the message transfer processing portion will be explained using FIG. 17. First, the message transfer processing portion reads a message stored in a port of the message transfer processing portion by making a request to an interprocess communication processing portion (step 3001). The flow proceeds to the next processing if the message is obtained and returns to the processing 4001 if no message is obtained (step 3002). Next, the kind of the obtained message is examined (step 3003).

If the message is a message based on the object name designated transmission, the message transfer processing portion reads information stored in the in-world object management database to determine a computer address and a port number at which a designated addressee object exists (step 3004). Then, the message transfer processing portion makes a request to the interprocess communication processing portion for the transmission of the read message with the determined computer address and port number being designated (step 3005)

If the message is based on the transmission with addressee judgement information, a function name given as the addressee judgement information is compared with information of object names, computer addresses, port numbers, acceptable message names and function names stored in the in-world object management database to determine a computer address and a port number of a message addressee object and a message name (step 3006). Then, the message transfer processing portion makes a request to the interprocess communication processing portion for message transmission with the determined computer address and port number of the addressee being designated (step 3007). In the case where a message name in the in-world object management database corresponding to a function name coincident with the function name given as the addressee judgement information is different from a message name of the received message, the message name of the received message is rewritten into the message name stored in the in-world object management database.

For example, in the case where a message based on the transmission with addressee judgement information or added with addressee judgement information of function B is transferred to the message transfer processing portion 2m in the world 2w, the message transfer processing portion 2m refers to the in-world object database 2d shown in FIG. 16B to know that a message having a message name of "message g" should be transmitted to the object 221 having a computer address of 22 and a port number of 101. In this case, even if a message name of the message transferred to the message transfer processing portion 2m is not designated or the message has a different message name, the message is transmitted after the correction of the message name to "message g". Accordingly, in the case where "message b" is sent to the object 121 in the world 1w, as mentioned above, the message transferred to the message transfer processing portion of the world 2w is transferred to the object 221 after the correction of the message name to "message g".

The function name in the in-world object database is stored with judgement information of whether transmission to one object suffices for realizing the corresponding function or broadcasting transmission to objects in the world is necessary. For example, in the case where a message based on the transmission with addressee judgement information or added with addressee judgement information of function D is transferred to the message transfer processing portion in the world 2w, the message transfer processing portion refers to the in-world object management database 2d shown in FIG. 16B to know that information of function D/part is stored for all the objects. This shows that each object realizes only a part of the function D and it is necessary to transmit a message to all of the objects in the world 2w in order to perform the function D. Accordingly, in this case, the transmission of a message with a message name of "k" to all the objects is requested to the interprocess communication unit with computer addresses and port numbers being designated.

Finally, if the message is based on the broadcasting transmission (step 3003), the transmission of the obtained message to all the objects stored in the in-world object management data base is requested to the interprocess communication unit with computer addresses and port numbers being designated (step 3008).

As mentioned above, a message transfer unit performs a message transfer processing by reading information stored in an in-world object management database. Also, the message transfer unit has a function of transferring a message sent from the associated meta object with objectification processing function of another world to an object in a world in which the message transfer unit exists.

(6) INTERPROCESS COMMUNICATION PROCESSING PORTION

In the present embodiment, the interprocess communication processing portion is realized using an interprocess communication function possessed by the operating system, as mentioned above. Accordingly, the meta object or the message transfer processing portion invokes a message transmit system call when it makes a request to the interprocess communication processing portion for the transmission of a message and invokes a message receive system call when it makes a request to the interprocess communication processing portion for the reading of a message in a port.

Figure 18A:
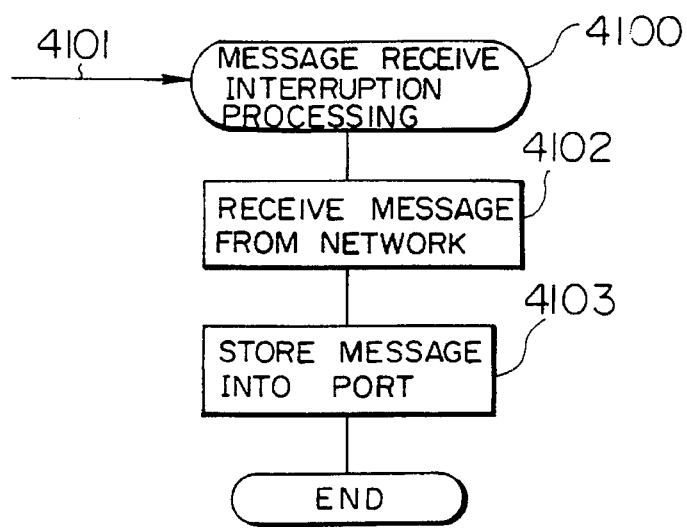
FIGS. 18A to 18C are charts showing processings performed by the interprocess communication unit in the one embodiment of the present invention.
Figure 18B:
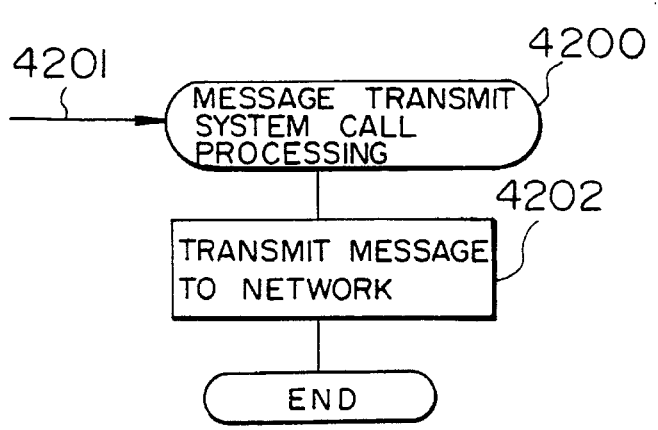
Figure 18C:
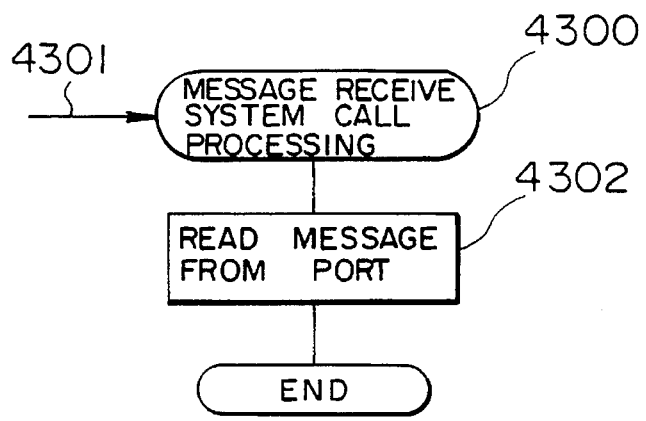

The outline of an operation in an interprocess communication processing portion will be explained using FIGS. 18A to 18C. Herein, the explanation will be made of the outlines of the operations of a message receive interruption processing 4100 activated upon arrival of a message from a computer other than a computer in which the interprocess communication processing portion under consideration exists, and a message transmit system call processing 4200 and a message read or receive system call processing 4300 activated by system calls from processes in the computer in which the interprocess communication processing portion under consideration exists.

The message receive interruption processing is activated when an interruption (4101) is made upon arrival of a message from the other computer through a network. The message sent from the network and following the TCP/IP protocol is received (step 4103). The message is stored into a designated port (step 4104), thereby completing the processing.

The message transmit system call processing is activated when a meta object (inclusive of a meta object with objectification processing function) or a message transfer processing portion in the computer, in which the interprocess communication processing portion under consideration exists, invokes a message transmit system call (step 4201). A given message is transmitted in accordance with the TCP/IP protocol (step 4202).

The message receive system call processing is activated when a meta object (inclusive of a meta object with objectification processing function) or a message transfer processing portion in the computer, in which the interprocess communication processing portion under consideration exists, invokes a message receive system call (step 4301). A message in a port is read and is delivered to the invoker (step 4302).

For the interprocess communication processing described above, the socket function of the UNIX operating system, as mentioned earlier, can be used as it is. Namely, as disclosed by the Design and Implementation of the 4.3 BSD UNIX Operation System (1989) referred to earlier, for example, a "send to" system call can be used as the message transmit system call and a "recv" system call can be used as the message receive system call. In this case, however, it is required that a process on the transmitting side and a process on the receiving side, which use the interprocess communication, are beforehand brought into allowable conditions for transmission/reception of messages with sockets by use of a "socket" system call for opening the sockets, a "bind" system call for assigning addresses to the sockets, a "connect" system call for issuing a connection request, a "listen" system call for accepting the connection request, an "accept" system call for establishing the connection, and so on.

Thus, the interprocess communication processing portion can be realized easily by using the interprocess communication function which the operating system has.

(7) EFFECTS OF ONE EMBODIMENT OF INVENTION

In the foregoing, the one embodiment of the present invention has been explained in detail. According to the one embodiment of the present invention, objects in one world can be managed in a modularized form. And, an object in another world, in which an object representing the one world exists, can request a processing to one object provided by objectification or modularization by merely transmitting a message to the one object without any consciousness of the functions of the modularized objects in the one world and of which computer those objects exist on. As a result, the effect is that efficient processing is made possible.

Also, even if a system construction including computers and objects in a world is changed, a change of information stored in an in-world object management data base handling information of that world is only required and no change is required for processings of objects, meta objects with objectification processing function, message transfer processing portion, etc. of another world. As a result, there is an effect that the extension/change of the system can be met flexibly.

Though a message between objects which belong to different worlds is transferred to a meta object with objectification processing function and a message transfer processing portion, a communication between the meta object with objectification processing function and the message transfer processing portion is designated and intervened by a function name. Therefore, even if a change is made for an object to realize a function corresponding to the function name or a message name for that function, it is only required that information stored in an in-world object management database to be subjected to such a change is actually changed. As a result, there is an effect that a flexible system can be realized.

A direct communication is not possible between objects which belong to different worlds, and only a part of functions in one world can be utilized from the exterior. Therefore, a good security is obtained and it is possible to prevent a system stoppage/destruction from occurring due to factors from another world. As a result, there is an effect that a high-reliability 10 distributed system can be realized.

According to the one embodiment of the present invention, even if a computer address and a port number of a message transferee or addressee object are unknown, a message can be transmitted with only the designation of an object name since a message transfer processing portion determines a computer address at which the addressee object exists and an interprocess communication processing portion determines a port number of the addressee object. Further, even if an object name of the name of the addressee object and a message name are unknown, the designation of the name of a function to be used suffices since the message transfer processing portion provides a function of determining the addressee object. As a result, there is an effect that it is possible to realize a system which is easy in the production of objects, has excellent reusability of objects and can flexibly cope with the extension/change of the system.

Also, since one world corresponds to one network, there is an effect that an in-world broadcasting communication can be made effectively. Further, since information concerning the construction in one network (such as computer addresses at which objects exist) is stored in an in-world object management data base on a computer connected to this network, the change of the construction in the network has no influence on the exterior of the network. As a result, there is an effect that a system management is facilitated.

According to the one embodiment of the present invention, since one meta object is provided for each object to make the execution/management of a communication processing, the object itself can transmit or receive a message without the consciousness of the details of a message transmit/receive processing using an interprocess communication processing portion. Further, even if a change in transmission system or the like is made, the change of a processing of the meta object suffices without having any influence on the object. As a result, there is an effect that the production of objects is easy and a good maintenance is obtained.

Further, since the meta object changes the sequence of messages in a message queue in accordance with the priority of the messages, the object can perform processings for the messages in the order of priority from a higher priority with no particular consciousness of the priority. Also, even in the case where a processing concerning the priority is changed, it is only necessary to correct a processing of the meta object. Therefore, it is possible to produce the object with the consciousness of the processing concerning the priority. As a result, there is an effect that the efficiency of development is improved and a flexible system can easily be realized.

(8) OTHER EMBODIMENTS OF INVENTION

In the one embodiment of the present invention, an object is one process. However, the object may be arbitrary, for example, an application program, a program module, a dedicated hardware, a server process, a file, or a database so long as it is the unit of processing which is activated by a message and utilizes a resource in the system. Thereby, an effect is provided that various resources in the system can be regarded as the same processing unit of an object, thereby allowing efficient utilization and management of the resources in the system.

In the one embodiment of the present invention, message transfer units and in-world object management data bases are provided. However, the system can be constructed without those components. In this case, a meta object with objectification processing function makes not the transfer of a message to a message transfer unit of a world other than a world in which the meta object exists but rather the transmission of a message to all objects in the other world on the basis of a broadcasting transmission system. A processing for the transmitted message is performed by an object which is capable of performing that processing. Thereby, an effect is provided that the system construction can be simplified and the system can easily be constructed.

In the one embodiment of the present invention, a meta object and an object are realized as the same process. However, they may be realized as individual processes. With such a construction, even if a failure occurs in one of those processes, no influence is given on the other process. Therefore, an effect is provided that a system having an excellent reliability can be realized.

In the one embodiment of the present invention, one meta object is provided for each object, and there may be realized a system in which an object having no need of an objectification processing is provided with no meta object but utilizes an interprocess communication unit directly. This also provides an effect that the system construction is simplified and the development becomes easy.

Further, in the one embodiment of the present invention, one meta object is provided for each object, and a plurality of objects can share one meta object which handles message transmission/reception for the plurality of objects. Thereby, an effect is provided that the system can be realized with a small amount of resources.

In the one embodiment of the present invention, message communication between objects for making a request for a processing is realized by the transmission/reception of a message which includes a message name and arguments. However, a remote procedure call can be used for the message communication. There by, an object can be described as a usual procedure. Therefore, an effect is provided that objects become easy to describe and existing programs become easy to reuse.

Figure 19:
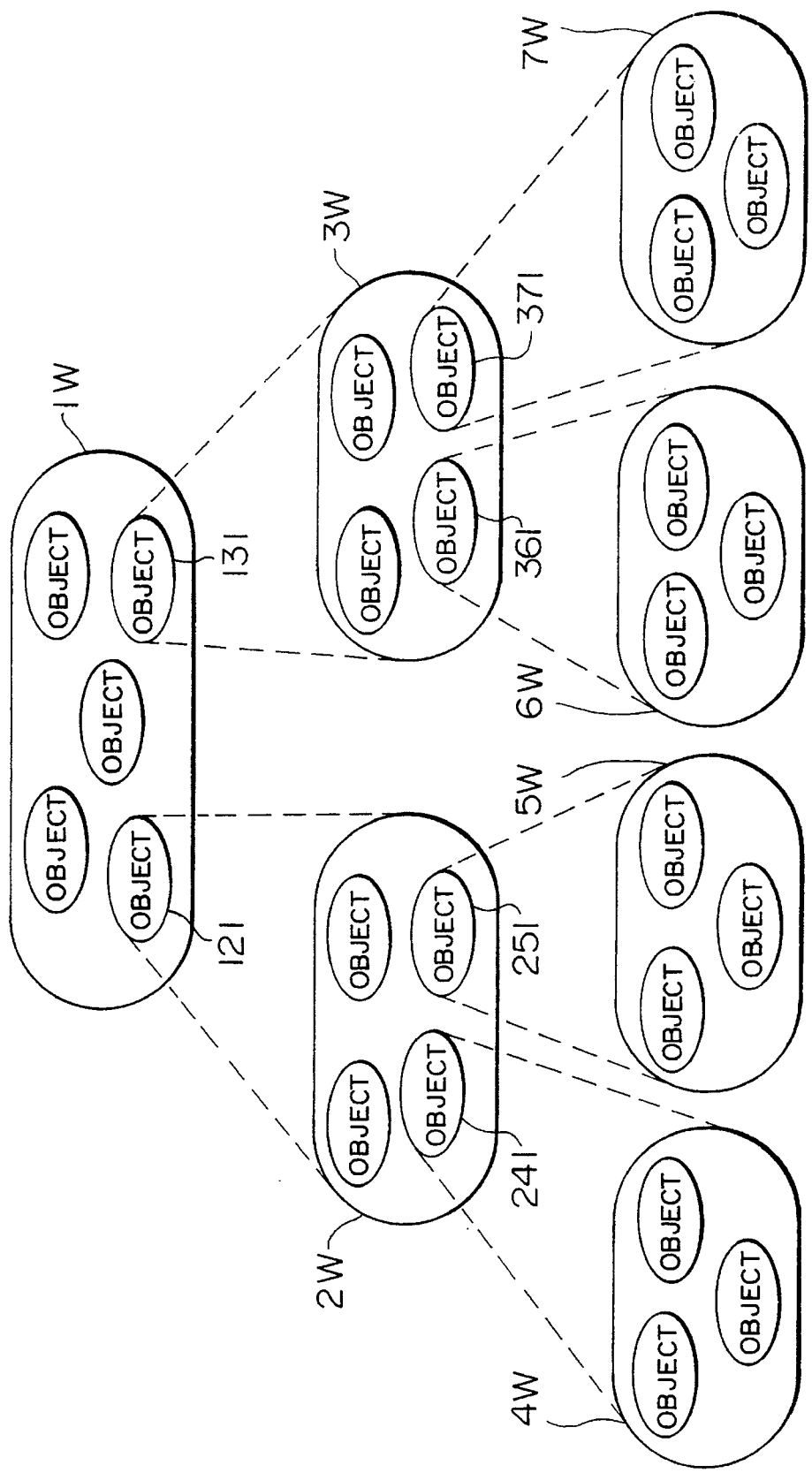
FIG. 19 is a diagram showing the construction of objects and worlds in another embodiment of the present invention.

In the one embodiment of the present invention, worlds are organized with a two-level hierarchy structure. However, a system having a multi-level world hierarchy structure can be realized in such a manner that a superordinate world composed of a plurality of objects inclusive of an object representing a certain world is represented by an object of a further superordinate world. For example, there can be realized a system, as shown in FIG. 19, in which worlds $4w$ and $5w$ are respectively represented by objects 241 and 251 in a world $2w$, worlds $6w$ and $7w$ are respectively represented by objects 361 and 371 in a world $3w$, and the worlds $2w$ and $3w$ are respectively represented by objects 121 and 131 in a world $1w$. Thereby, a large scale distributed system including a large amount of objects can be easily realized.

Figure 20:
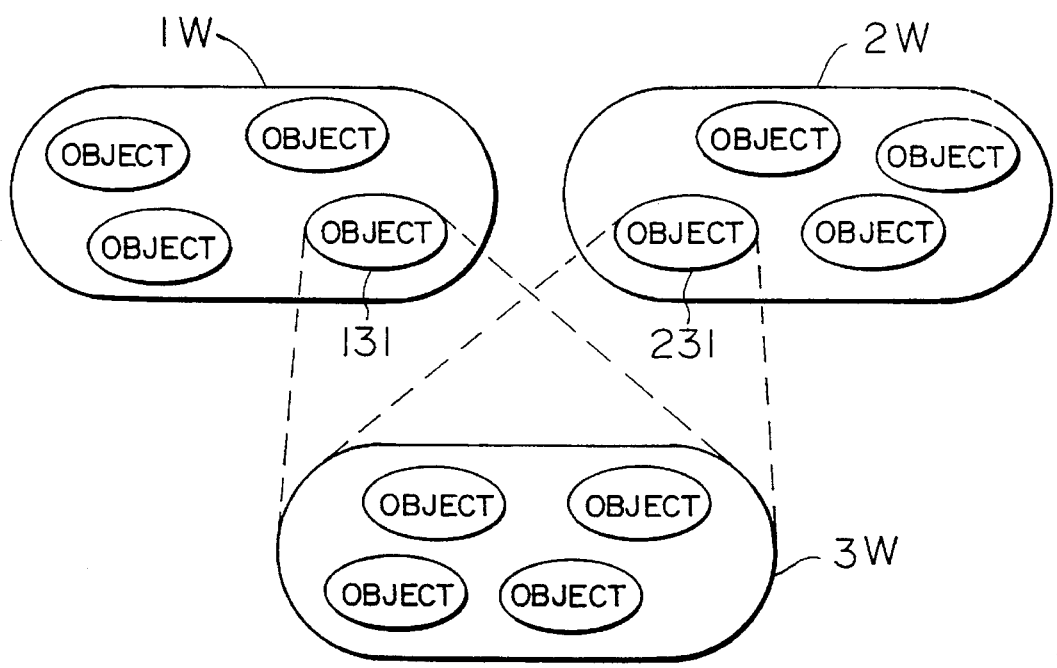
FIG. 20 is a diagram showing the construction of objects and worlds in another embodiment of the present invention.

In the one embodiment of the present invention, one world is represented by one object. However, one world can be represented by a plurality of objects. For example, in FIG. 20, a world $3w$ is represented by an object 131 in a world $1w$ and an object 231 in a world $2w$. Thereby, an effect is provided that objects of two different worlds can commonly utilize the function of another world. In the case where one world is represented by objects of two different worlds, the objects can represent different functions or data. Thereby, an effect is obtained that interfaces suitable for the respective worlds can be provided, thereby making it possible to effectively realize a complicated distributed system.

Figure 21:
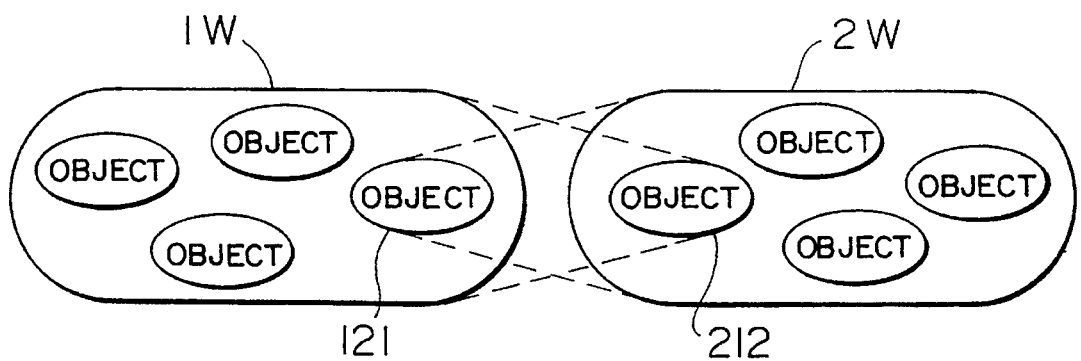
FIG. 21 is a diagram showing the construction of objects and worlds in another embodiment of the 15 present invention.

In the one embodiment of the present invention, a bi-directional objectification processing can be realized in such a manner that a first world is represented by one object in a second world, and the second world, including this object provided by objectification, is represented by one object included in the first object. For example, there is provided a system, as shown in FIG. 21, in which a world $1w$ is objectified into an object 212 in a world $2w$ and the world $2w$ is objectified into an object 121 in the world $1w$. Thereby, an effect is provided that a plurality of worlds can request processings from each other on an equivalent basis with each other, thereby making it possible to realize a flexible distributed system and one world can be realized easily by combining two existing worlds.

In the one embodiment of the present invention, one network corresponds to one world. However, there can be employed a construction in which a plurality of networks correspond to one world or one network corresponds to a plurality of worlds. Thereby, an effect is provided that it is possible to realize a flexible system construction capable of coping with a large scale distributed system.

In the one embodiment of the present invention, a message from a subordinate world to a superordinate world is only an answer message to a message from the superordinate world. However, an object in the subordinate world can make a request to a message transfer processing portion for the transfer of a message in order to utilize the function of an object in the superordinate world. Thereby, it becomes possible to make more efficient utilization of functions or data of objects.

In the one embodiment of the present invention, a message transfer processing portion determines the transferee of a message by referring to only the functions of objects in a world which are handled by the message transfer processing portion. However, when there exists a plurality of objects to which a message can be transferred, it is possible to judge the operating conditions of computers including those objects, thereby selecting an object on a computer having a smaller operation rate to transfer a message to the selected object. Thereby, an effect is provided that an efficient distributed processing can be realized.

According to the foregoing embodiments, a large amount of objects can be managed in modularized form so that the consideration of only one object provided by objectification is required with no need of any consciousness of details of the functions or data of a plurality of objects modularized and which computer an object exists on. As a result, there is an effect that the utilization and management of objects become easy and efficient.

Also, the transmission of a message, in the case where a processing is requested to an object, can be made without consciousness of which object on which computer a message should be transmitted to and which communication system should be used. As a result, there is an effect that a communication management becomes easy and efficient.

Even if a system construction in a module including computers and objects is changed, it is not necessary to change an interface with the exterior. This provides an effect that the extension/change of the system can be met flexibly. Also, no influence is had on objects of the exterior. This provides an effect that the reusability of software is improved. Further, there is provided an effect that a high-security, highreliability distributed system capable of preventing system stoppage/destruction caused by factors from the exterior can be realized by employing a construction which makes it impossible to directly use objects in a module from the exterior.

Furthermore, since hierarchical management and utilization of a large amount of resources become possible by combining the modularization and the objectification hierarchically, there is an effect that a large scale distributed system can easily be realized.

Next, a further embodiment of the present invention will be explained.

(9) FURTHER EMBODIMENT OF INVENTION

First, the outline of the further embodiment of the present invention will be explained. In the present embodiment, one process, one file or the like is regarded as one object. In a distributed processing system, an application program is realized by a plurality of objects. Accordingly, in the distributed processing system, a processing is advanced with communication being made by objects.

Figure 22:
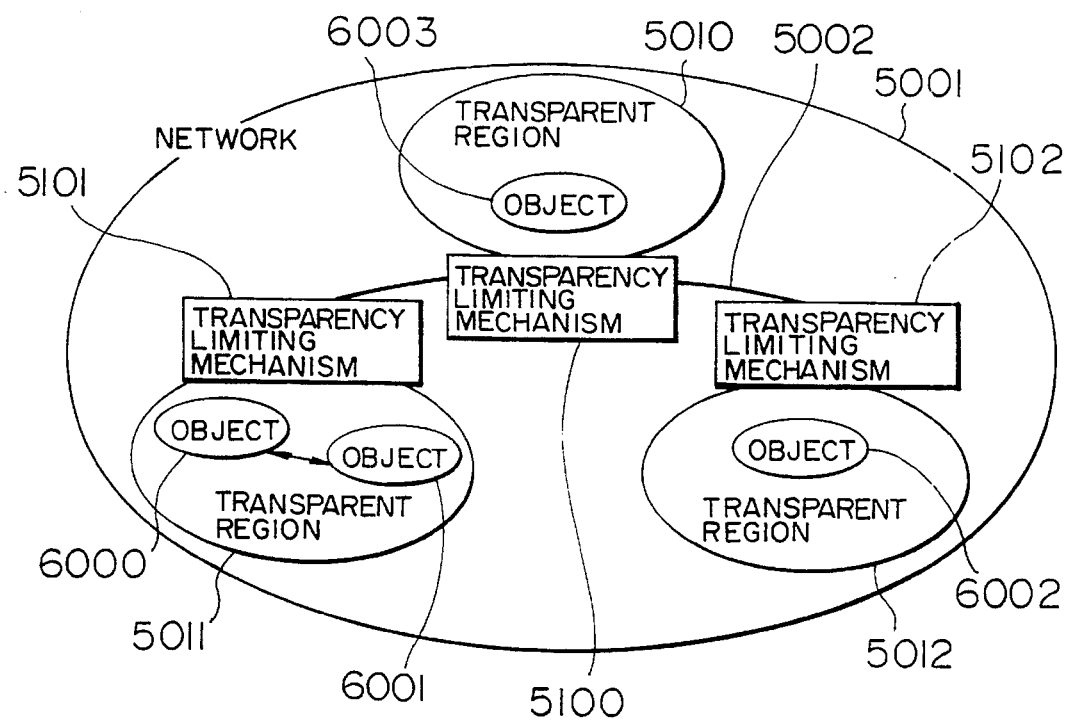
FIG. 22 is a conceptual diagram representing a further embodiment of the present invention.

FIG. 22 provides a conceptual illustration of the further embodiment of the present invention. A multiplicity of objects 6000, 6001, 6002 and 6003 exists in a network 1 provided with a distributed processing system. In order to maintain the transparency (or transmissibility) of the network 1, the multiplicity of objects 6000, 6001, 6002 and 6003 must be managed unitarily. The so-called transparency referred to herein means a condition in which any computer can utilize an object of any computer with no need of the consciousness of a place where the object exists. Therefore, in a transparent network, a user of a computer can process as if using one big computer irrespective of the computer actually used by the user. However, it does not follow that all of the objects 6000, 6001, 6002 and 6003 always communicate with each other as one application. In general, therefore, a technique may be considered which manages every one of plural objects having a close relationship therebetween in order to manage a large amount of resources. In the present embodiment, the objects are managed for every range in which the transparency of the system should be maintained between closed related objects. This range of the network, in which the transparency is maintained, is called a transparent (or transmissible) region. In the case of the present embodiment, the objects 6000 and 6001 are managed in a transparent region 5011, the object 6002 is managed in a transparent region 5012, and the object 6003 is managed in a transparent region 5010. A direct communication is possible between the objects 6000 and 6001 in the transparent region 5011 but is impossible between the object 6000 or 6001 and the object 6002 or 6003 which belongs to the transparent region different from that of the object 6000.

However, if communication between objects of different transparent regions is completely cut off, an object in any transparent region cannot be utilized from the exterior of that transparent region, thereby making effective utilization of objects impossible. In the present embodiment, in order to allow an object in any transparent region to communicate with an object outside that transparent region, transparency (or transmissibility) limiting mechanisms 5100, 5101 and 5102 for limiting the transparency between transparent regions are provided for the respective transparent regions. The transparent regions are coupled to a communication path 5002 through the transparent limiting mechanisms 5100, 5101 and 5102. Thereby, a user of a certain transparent region can use not only the distributed processing system but also objects outside that transparent region without taking information outside that transparent region into consideration.

(10) SYSTEM CONSTRUCTION

Figure 23:
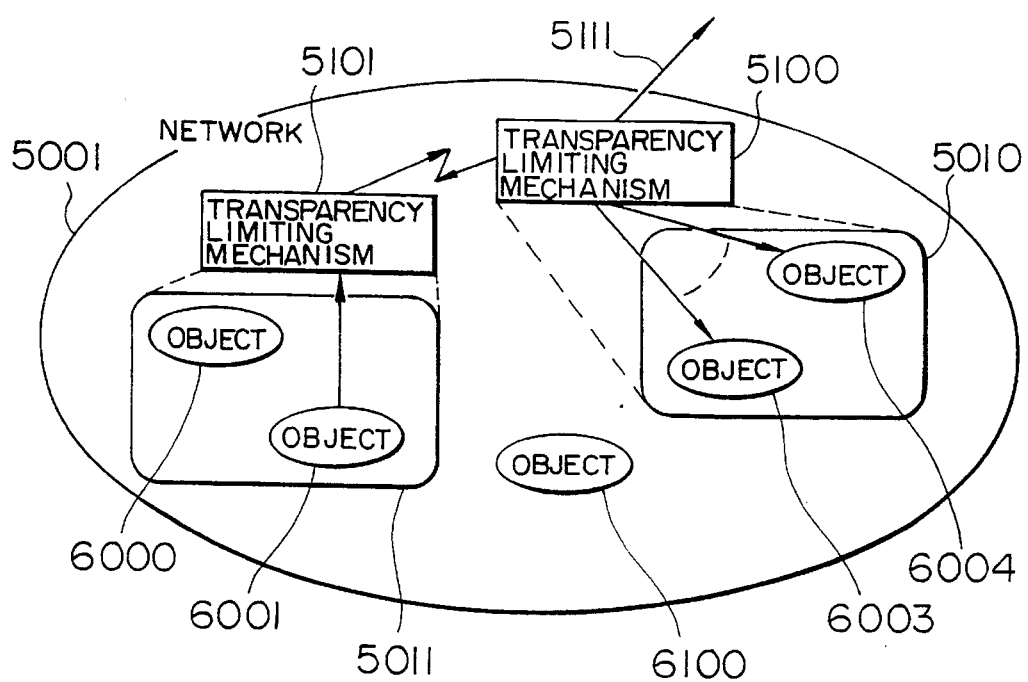
FIG. 23 is a diagram representing a system construction in the further embodiment of the present invention.

Next, a system construction according to the present embodiment will be explained using FIG. 23. It is assumed that a world is divided by transparency limiting mechanisms 5100 and 5101 into one or more transparent regions 5010, 5011 and zero or more than object 6100 which belongs to no transparent region, as shown in FIG. 23. Now, in the case where an object 5001 needs to use a resource which is not provided in the transparent region 5011, the object 6001 makes a request to the transparency limiting mechanism 5101 for communication transfer to the exterior of the transparent region 5011. There may be the case where the transferee of communication by the transparency limiting mechanism 5011 is another transparency limiting mechanism and the case where it is another object outside the transparent region 5011. FIG. 23 shows the case where the transferee is the other transparency limiting mechanism 5010. The transparency limiting mechanism 5101, to which the object 6001 made the request for the communication transfer, transfers the communication to the transparency limiting mechanism 5100 by which the resource required by the object 6001 seems to be probably managed and which manages the other transparent region 5010. In the case where a resource satisfying the transferred request exists in the transparent region 5010 managed by the transparency limiting mechanism 5100, the communication is transferred to one or more objects 6003, 6004 which is capable of providing the resource. On the other hand, in the case where any resource capable of being provided does not exist in the transparent region 5010 managed by the transparency limiting mechanism 5100, the transparency limiting mechanism 5100 makes communication transfer 5111 to another transparency limiting mechanism or object.

Figure 24:
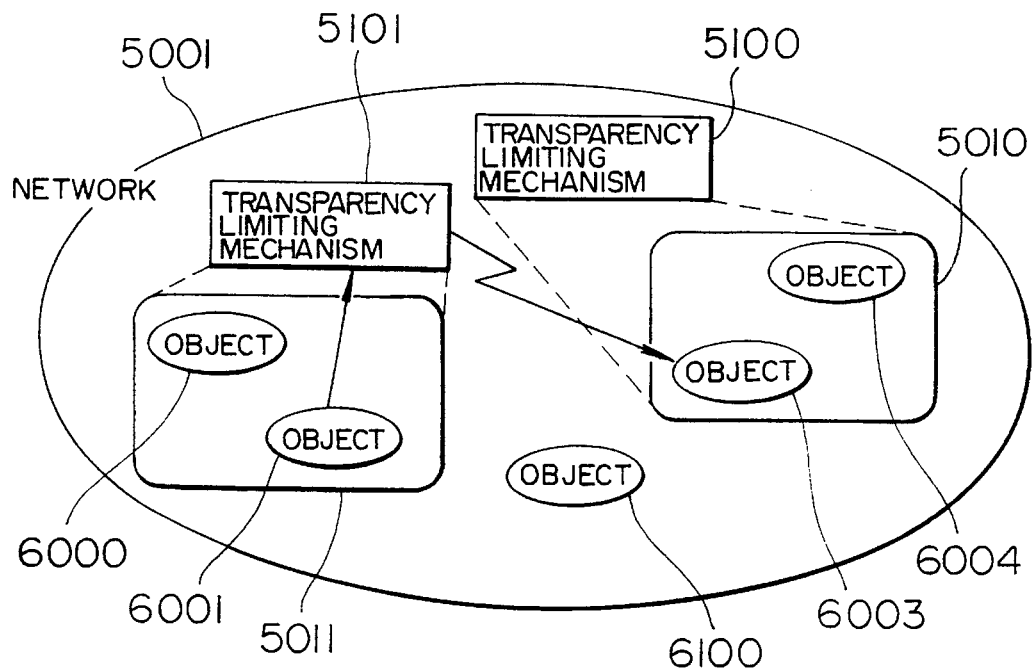
FIG. 24 is a diagram representing another system construction in the further embodiment of the present invention.

In the case where the resource required by the object 6001 is an object which belongs to no transparent region or in the case where the resource can uniquely be specified in the entire network, for example, in the case of a request to a data base management system which unitarily manages information in the network, the transparency limiting mechanism 5101, as required, can transfer the communication directly to a specified object 6003 which has the resource required by the object 6001, as shown in FIG. 24.

Figure 25:
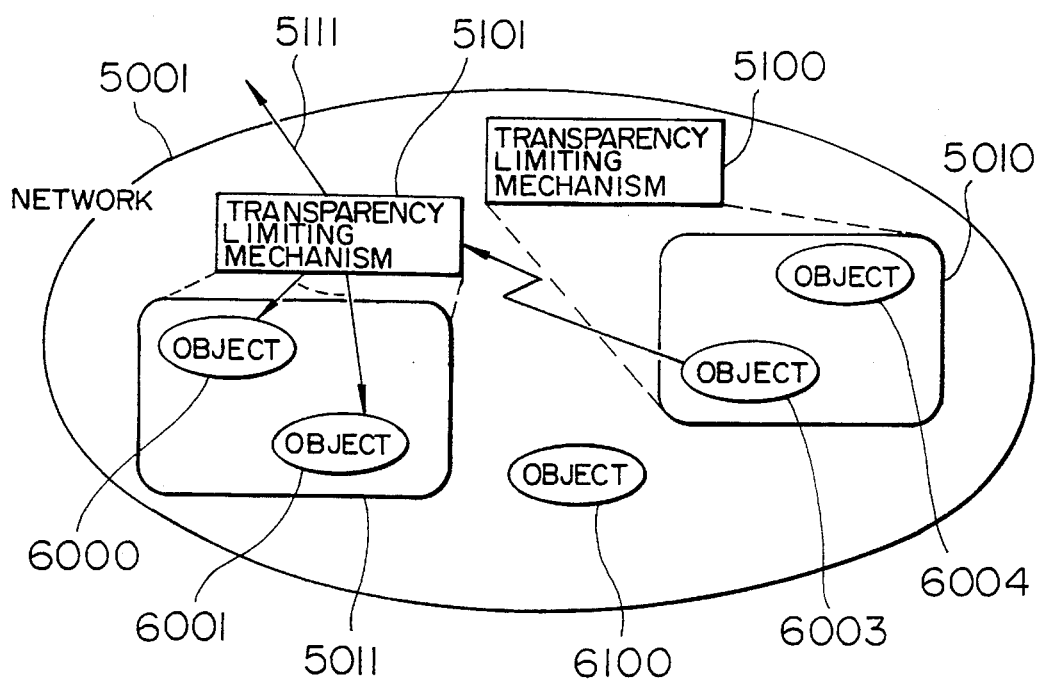
FIG. 25 is a diagram representing a further system construction in the further embodiment of the present invention.

In the case where an object requires a resource absent in the transparent region to which that object belongs, and has information concerning another transparent region having a possibility of providing the resource required, the transparency is limited, as shown in FIG. 25. Namely, in the case where an object 6003 requires a resource absent in the transparent region to which the object 6003 belongs, is aware of a transparent region 5011 having a possibility of provision of the resource required, the object 6003 sends a communication to a transparency limiting mechanism 5101 which manages the transparent region 5011. In the case where a resource satisfying the sent request exists in the transparent region 5011 managed by the transparency limiting mechanism 5101, the communication is transferred to one or more objects 6000, 6001 which are capable of providing the resource. On the other hand, in the case where any resource capable of being provided does not exist in the transparent region 5011 managed by the transparency limiting mechanism 5101, the transparency limiting mechanism 5101 makes communication transfer 5111 to another transparency limiting mechanism or object, as required.

As mentioned above, communication between different transparent regions using a transparency limiting mechanism may take three kinds of configurations, that is, a first kind of configuration in which the transmitting side and the receiving side of the communication are transparency limiting mechanisms, a second kind of configuration in which the transmitting side is a transparency limiting mechanism and the receiving side is an object and a third kind of configuration in which the transmitting side is an object and the receiving side is a transparency limiting mechanism.

(11) TRANSPARENCY LIMITING MECHANISM

Next, the structure of the transparency limiting mechanism for realizing the three kinds of transparency limiting configurations as mentioned above will be explained using FIG. 26. A transparency limiting mechanism 5101 includes communication judgement processing 5201, a transparent information data base 5210 and communication transfer processing 5202. When a communication transfer request to the transparency limiting mechanism 5101 occurs, the communication judgement processing 5201 inquires of the transparent information data base 5210 in which information concerning the transparent region managed by the transparency limiting mechanism 5101 is stored. The communication judgement unit 5201 obtains information of the transferee from the transparent information data base 5201 and makes a request to the communication transfer unit 5202 for communication transfer on the 5 basis of the obtained transferee information.

The transparent information data base 5210 is composed of an information change-over processing 5212 which makes a dynamic change-over between transparent regions, and transparent region information 5213 and 5214 which include information concerning transparent regions. The dynamic change-over between transparent regions is made by a command 5211 from a system administrator or a user having authority for the dynamic change-over between transparent regions. Upon arrival of the command 5211, the information change-over processing 5212 changes, a pointer to transparent region information to which the communication judgement processing 5201 refers or the address of transparent region information to be used or an offset to the transparent region information, to transparent region information designated by the command 5211, thereby making a change-over between transparent regions.

Thereby, it becomes possible to flexibly cope with a change in network construction.

TABLE 1

| Transparent Region Information | |
|---|---|
| Resource Information | Resources Provided by Objects in Region, Addresses of Objects in Region, Names of Objects Allowed for Acceptance of Resources to be Provided |
| Transferee Information | |

Table 1 shows the contents of the transparent region information. The transparent region information is divided into resource information and transferee information. The resource information is composed of the names of resources or services provided by objects in the transparent region and the addresses of the objects in the transparent region corresponding to the resources to be provided. When the acceptance of the resources to be provided is not allowed to all objects or when there are limited objects to which the acceptance of the resources to be provided is allowed, information concerning the names of objects allowed for the acceptance of the resources to be provided is added, as required. Thereby, a fine limitation for utilization of resources depending on objects used by a user becomes possible in addition to a qualificatory limitation for utilization of resources imposed on each user in the conventional system.

The transferee information is used when a communication is transferred to the exterior of the transparent region which the transparency limiting mechanism under consideration manages. The transferee information includes a transferee address for a transparency limiting mechanism other than the transparency limiting mechanism under consideration or an object outside of the transparent region which the transparency limiting mechanism under consideration manages. When the communication is to be transferred to a plurality of objects, a plurality of transferee addresses are described. When there is no transferee, that is, when no transfer is made, no transferee address is described or the transferee address is described with an address at which the communication results in certain failure.

TABLE 2

| | Contents of Communication |
|---|---|
| Addressee Information | Addressee Address |
| Communication Information | Communication Processing Identification Name, Transferrer Address (Address of Transparency Limiting Mechanism), [Limited Number of Times of Transfer] |
| Requested Resource Information | Requested Resource Name, [Answeree Information (Information of Object to Which Answer is to be Made)] |
| Message to Be Processed | |

Table 2 shows the contents of a communication which is transferred by the communication transfer processing. A communication request sent out by the communication transfer processing is divided into four parts, that is, addressee information, communication information, requested resource information and message to be processed. The addressee information is the addressee address of a transparency limiting mechanism or an object to which a communication is to be transmitted. The communication information is composed of a communication processing identification name for discriminating a communication processing to be sent out from another communication processing and the transferrer address of a transparency limiting mechanism which requested the transfer of the communication. When it is necessary to limit the number of times of communication transfer, the limited number of times of transfer is additionally provided. The communication transfer unit checks the limited number of times of transfer. If the limited number of times of transfer is not zero, the communication transfer unit transfers the communication after subtraction of 1 from the limited number of times of transfer. If the limited number of times of transfer is zero, the communication transfer unit gives an answer of failure in communication. The requested resource information is the name of a resource requested by an object. As required, answeree information is added as information of an object to which an answer is to be made when the requested resource is processed, that is, a communication addresser object which first issued the communication. The answeree information is, for example, answeree information for the communication addresser object. The message to be processed is a message or information, concerning the requested resource, sent out by the transmitting object through the original communication.

Figure 26:
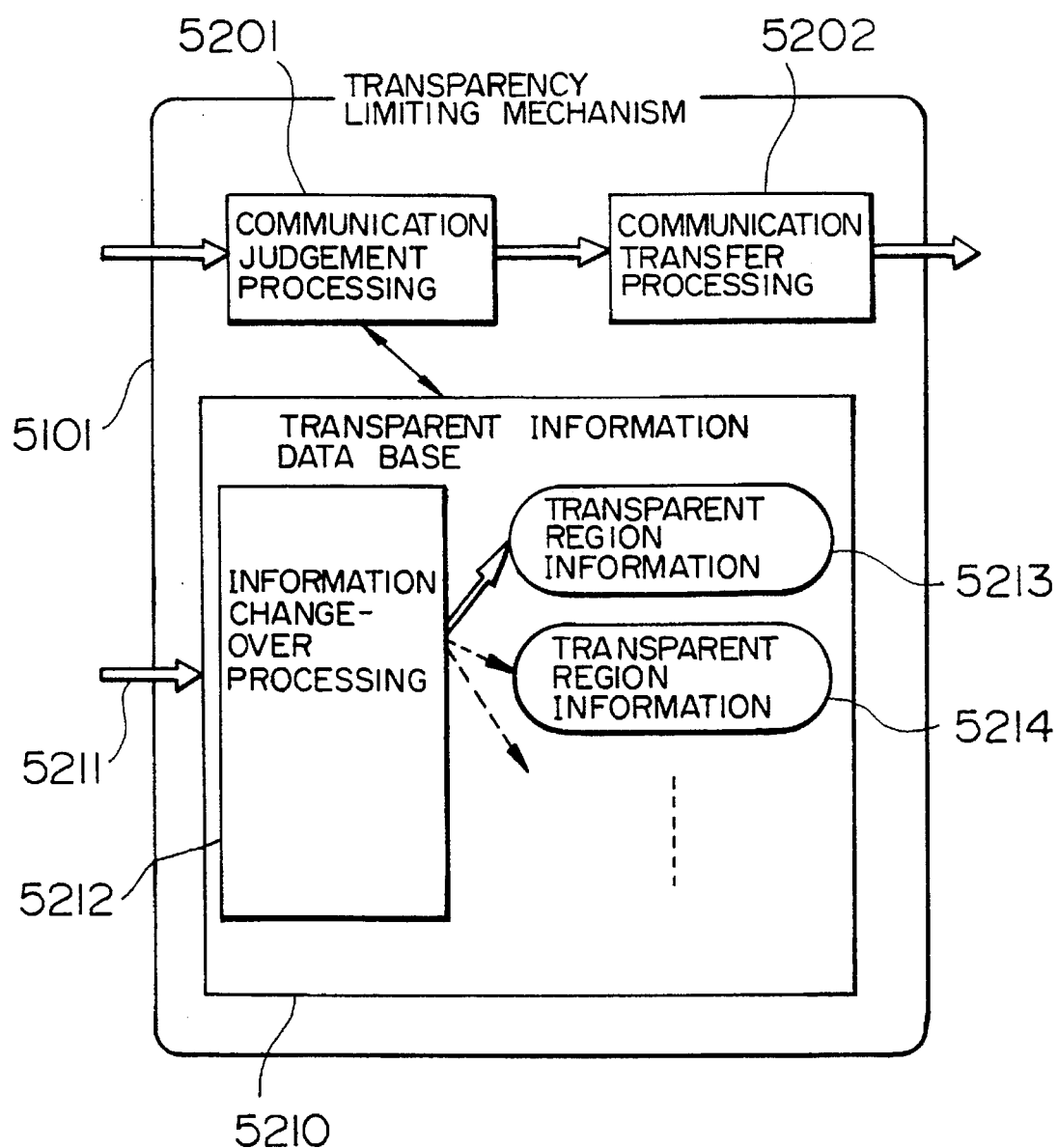
FIG. 26 is a diagram representing the construction of a transparency limiting mechanism in the further embodiment of the present invention.
Figure 27:
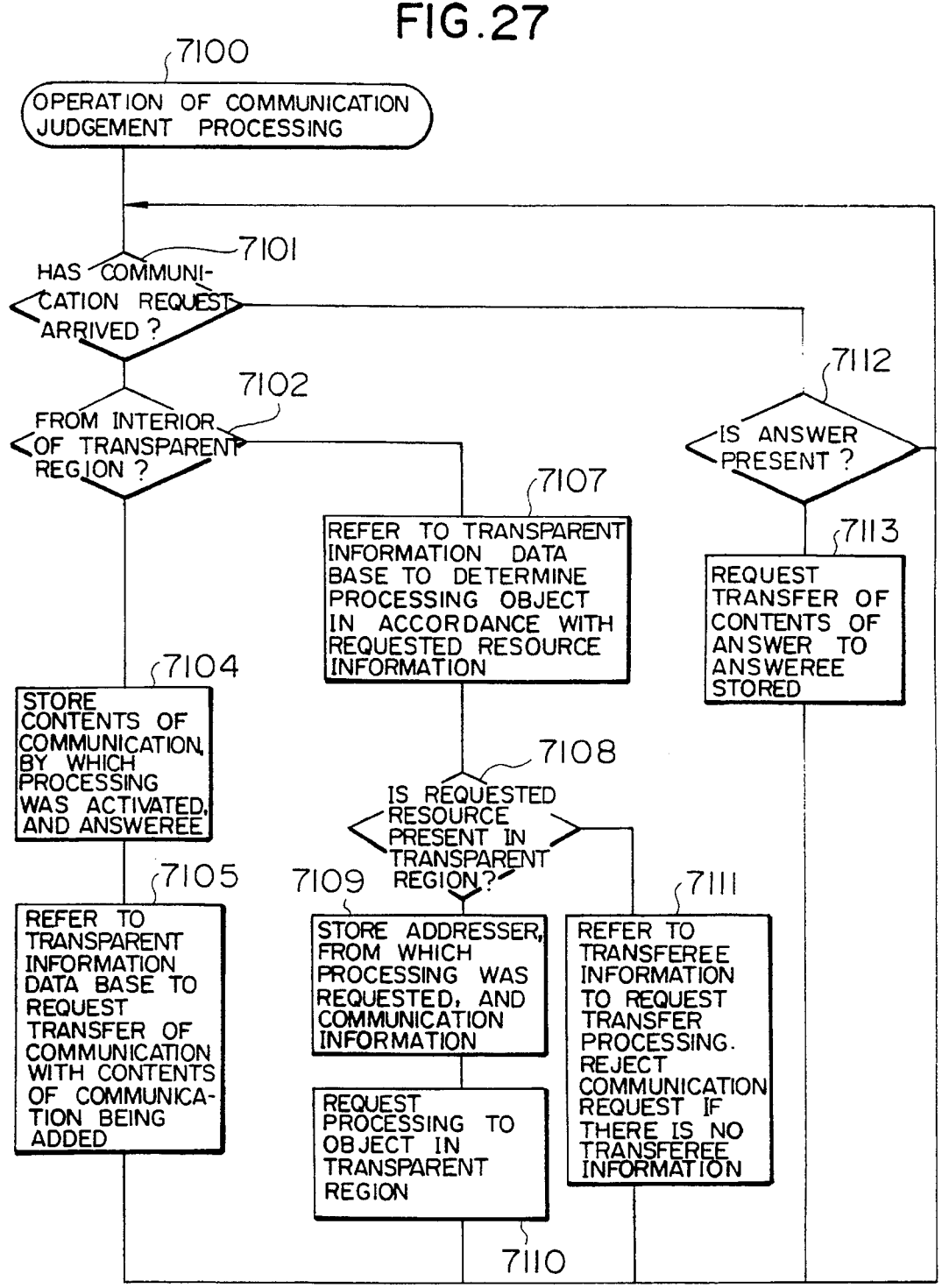
FIG. 27 is a diagram representing the operation of a communication judgement processing performed by the transparency limiting mechanism in the further embodiment of the present invention.

FIG. 27 illustrates the operation of the communication judgement processing 5201 shown in FIG. 26. In the communication judgement processing, the examination is first made as to whether or not a communication request has arrived at the transparency limiting mechanism under consideration (step 7101). When the request has arrived, the examination is made as to whether the request is one from the interior of a transparent region managed by the transparency limiting mechanism under consideration or one from the exterior thereof (step 7102). If the communication request is one from the interior of the transparent region, there are stored the name of an object, by which a communication processing was activated, a communication processing identification name and an answeree (step 7104). Next, reference to the transparent information data base 5210 is made to request the transfer of the communication to the communication transfer processing 5202 with the contents of the communication being added (step 7105). If the communication request is one from the exterior of the transparent region, reference to the transparent information data base is made to determine a transferee of the communication in accordance with requested resource information possessed by the requested communication (step 7107). At this time, when a resource name included in the requested resource information is coincident with one of resource names included in transparent region information stored in the transparent information data base (step 7108), there are stored the address of a transmitter or addresser, from which the communication processing was requested, and communication information (step 7109), and the communication is sent to an object in the transparent region to request the processing to the object (step 7110). On the other hand, when the resource requested and capable of being provided does not exist in the transparent region managed by the transparency limiting mechanism under consideration, reference to transferee information in the transparent region information is made to request the transfer of the communication with the contents of the communication being added. When there is no transferee information, the communication judgement processing 5201 rejects the communication request and gives an answer of failure in communication (step 7111). When the communication request has not arrived at the transparency limiting mechanism, the examination is made as to whether or not there is an answer to the communication which the transparency limiting mechanism has transferred (step 7112). If there is an answer, the transfer of the contents of the answer to an answeree stored is requested to the communication transfer processing 5202.

(12) COMMUNICATION PROCEDURE

Figure 28:
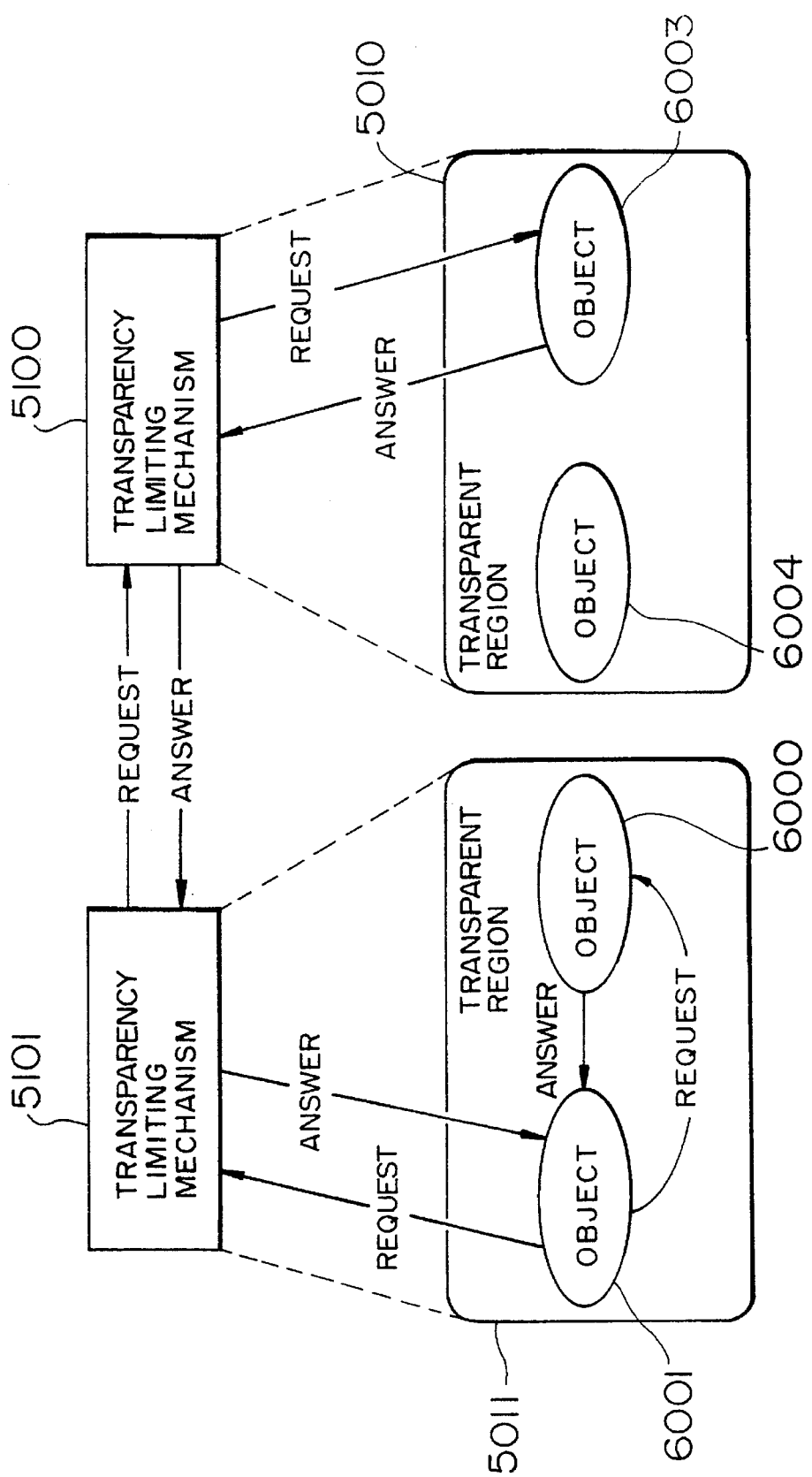
FIG. 28 is a diagram representing an example of the procedure of communication between objects in the further embodiment of the present invention.

FIG. 28 shows the procedure of a communication using the transparency limiting mechanisms. When an object 6001 belonging to a transparent region 5011 communicates with an object 6000 belonging to the same transparent region 5011, a direct communication including a request and an answer is possible therebetween since the transparency is maintained in the same transparent region. However, when there occurs a need of utilizing a resource provided by an object which belongs to another transparent region, the object 6001 makes a communication transfer request for utilization of the resource to a transparency limiting mechanism 5101. The transparency limiting mechanism 5101, to which the request is made, transfers a communication to a transferee address for a transparency limiting mechanism 5100 of a transferee obtained from a transparent information data base of the transparent region 5011. At this time, communication information sent from the object 6001 is stored, and thereinstead the original communication processing identification name and the transferrer address are rewritten into a new communication processing identification name in the transparency limiting mechanism 5101 and an address for transfer to the transparency limiting mechanism 5101, respectively. When the resource utilization requesting communication is transferred to the transparency limiting mechanism 5100, the mechanism 5100 refers to a transparent information data base of a transparent region 5010 to transfer the resource utilization requesting communication to an object 6003 having that one of the names of resources provided by objects in the transparent region 5010 which is coincident with the requested resource name. At this time, the communication information rewritten by the transparency limiting mechanism 5101 is stored, and thereinstead the communication is transferred with the communication information being rewritten, that is, the communication processing identification name and the transferrer address being rewritten into the communication processing identification name and the address of the transparency limiting mechanism 5100, respectively. The object 6003 receiving the resource utilization requesting communication returns an answer as the result of processing. At this time, when the resource utilization requesting communication includes answeree information as requested resource information, it is possible to return the answer directly to the object 6001 of the original communication addresser since the system is primarily transparent. When the answeree information is not added, the answer is returned to a transferrer address described in the communication information. The answer is received by the transparency limiting mechanism 5100 which in turn restores communication information coincident with the communication processing identification name having been stored and returns the received answer to a transferrer address included in the restored communication information. This answer is received by the transparency limiting mechanism 5101 which in turn restores communication information similarly and returns the received answer to the object 6001.

Figure 29:
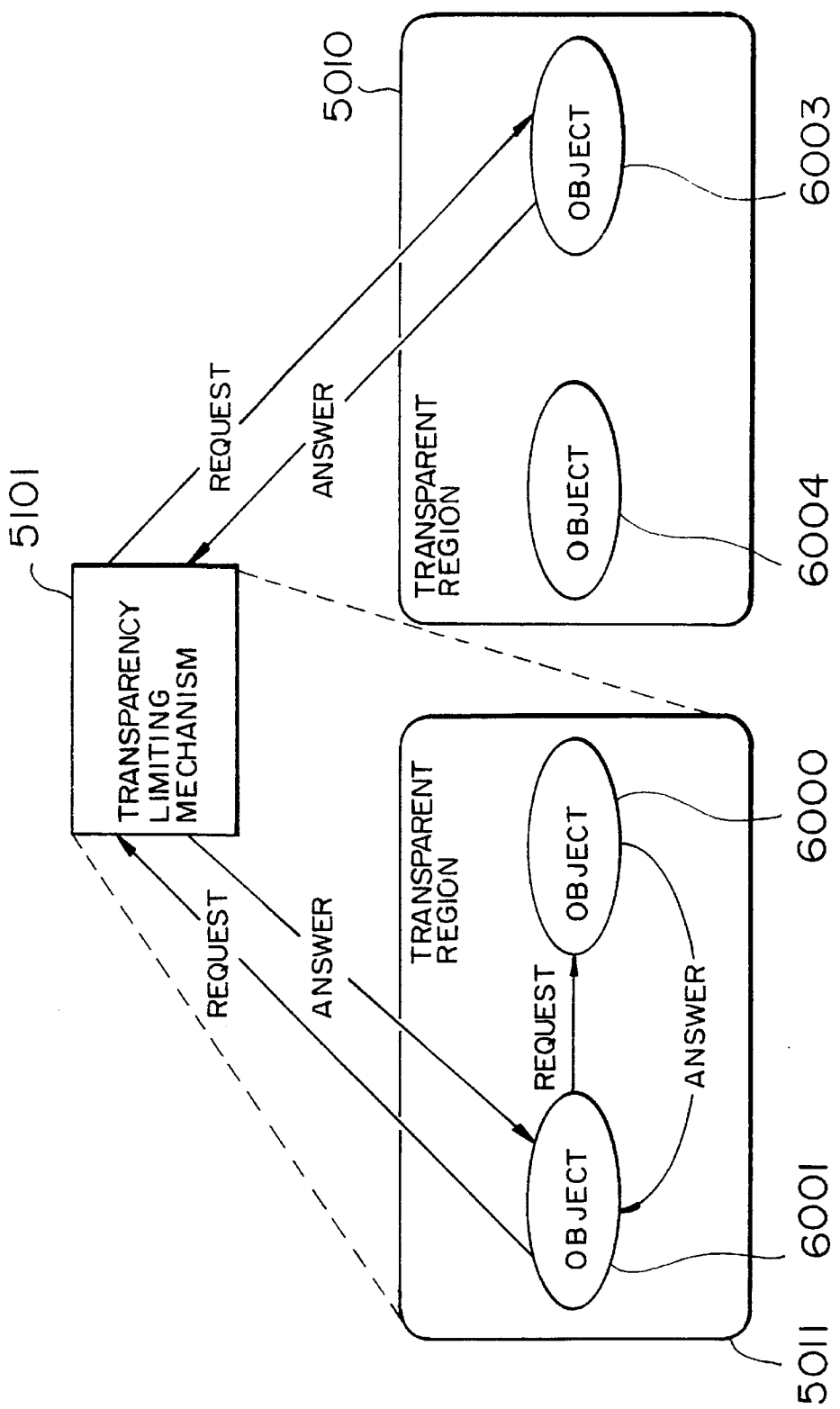
FIG. 29 is a diagram representing another example of the procedure of communication between objects in the further embodiment of the present invention.
Figure 30:
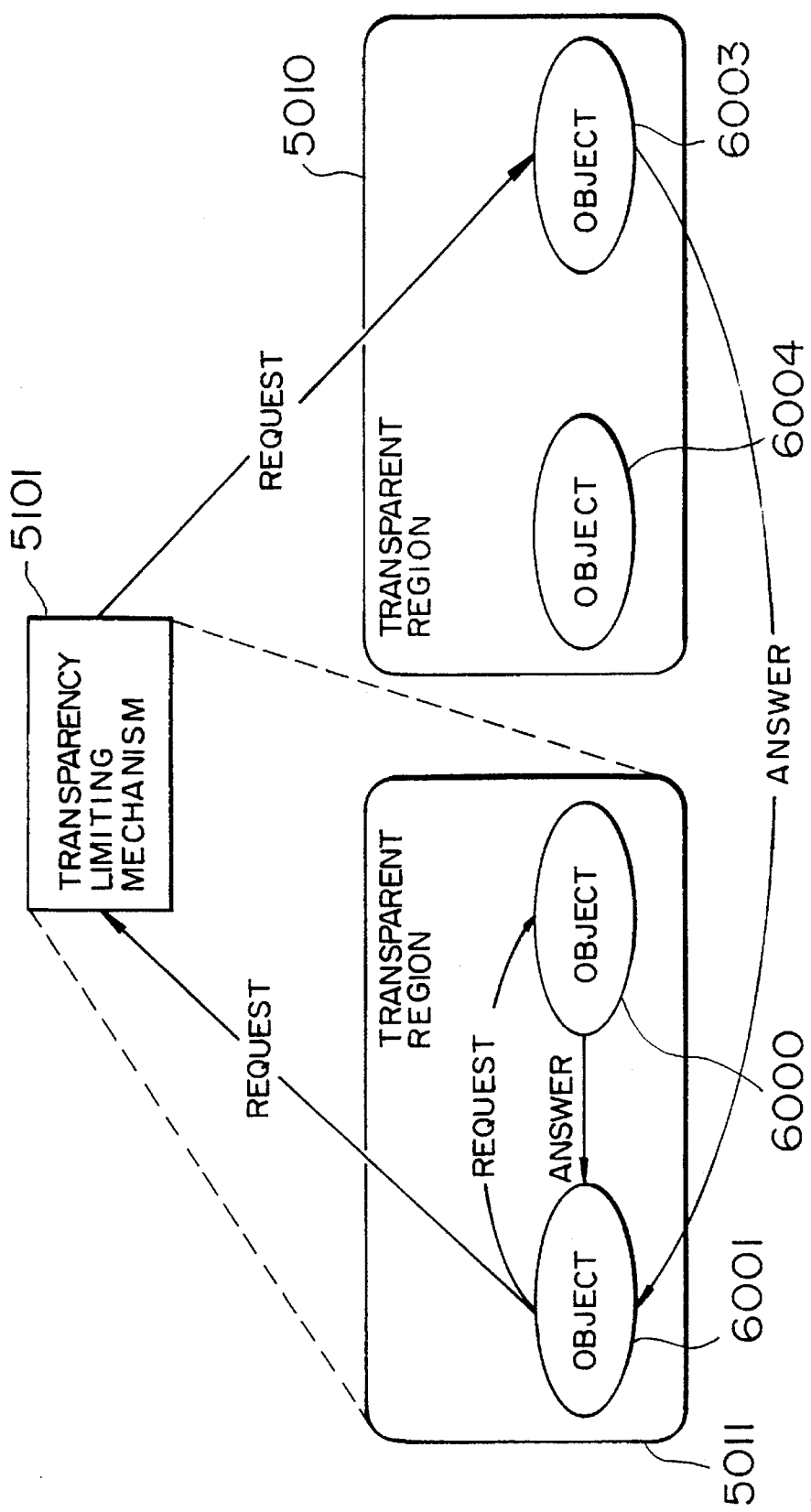
FIG. 30 is a diagram representing a further example of the procedure of communication between objects in the further embodiment of the present invention.

FIGS. 29 and 30 show examples of when transferee information given by the transparent information data base referred to by the transparency limiting mechanism 5101 is an address for direct communication to the object 6003 which belongs to the other transparent region 5010. In those cases, communication information sent from the object 6001 is stored, and thereinstead the original communication processing identification name and the transferrer address are rewritten into a new communication processing identification name in the transparency limiting mechanism 5101 and an address for transfer to the object 6003, respectively. The object 6003 receiving a resource utilization requesting communication returns an answer as the result of processing. At this time, when the resource utilization requesting communication includes answeree information as requested resource information, it is possible to return the answer directly to the object 6001 of the original communication addresser, as shown in FIG. 30, since the system is primarily transparent. On the other hand, when the answeree information is not added, the answer is returned to a transferrer address described in the communication information, that is, the transparency limiting mechanism 5101, as shown in FIG. 29.

Figure 31:
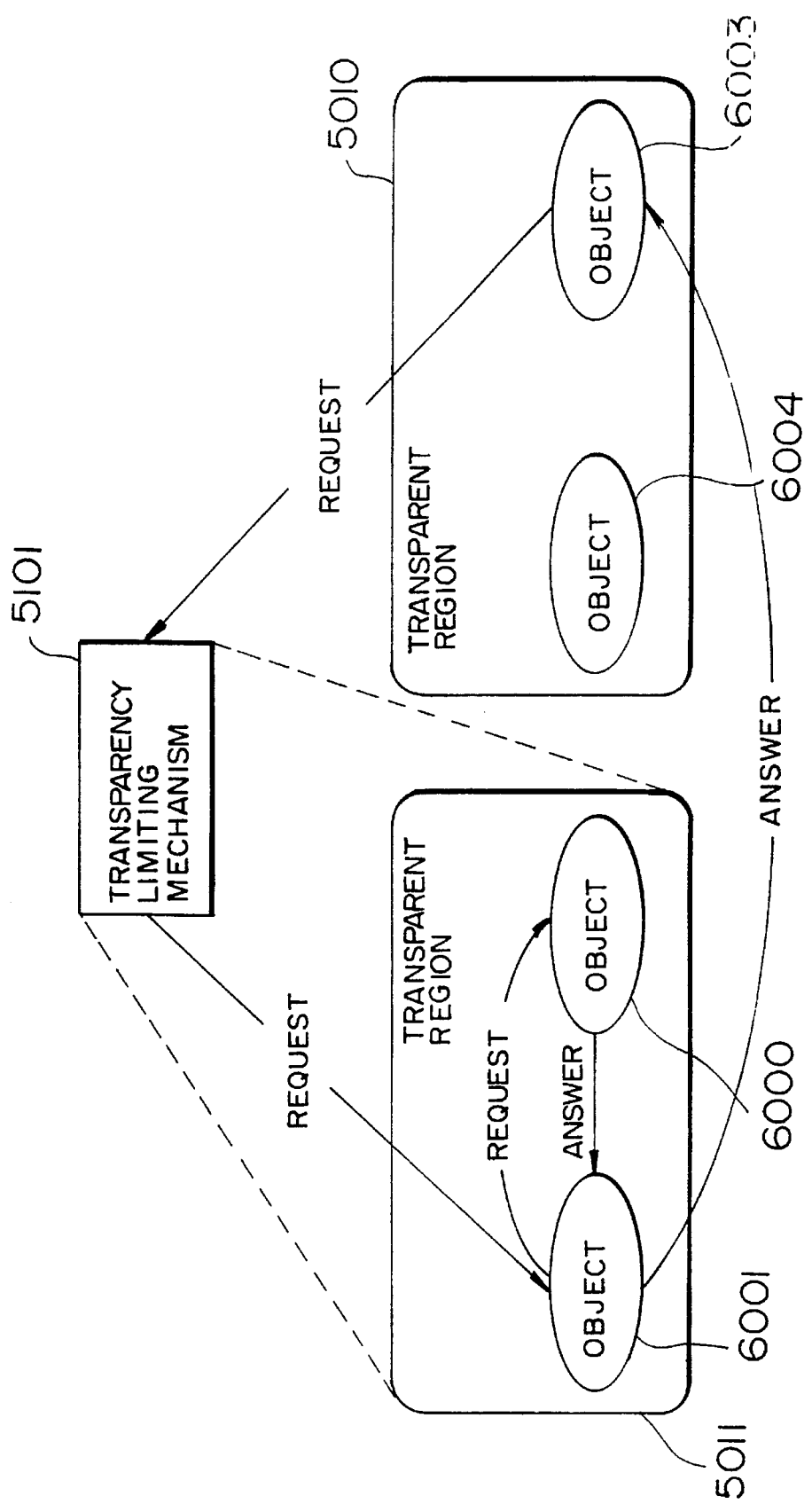
FIG. 31 is a diagram representing a still further example of the procedure of communication between objects in the further embodiment of the present invention.

FIG. 31 shows the case where an object 6003 belonging to a transparent region 5010 needs to utilize a resource provided by an object belonging to another transparent region and can know an address for communication to another transparent region to which an object capable of providing the resource required by the object 6003 belongs probably. In this case, the object 6003 makes a communication for a resource utilization request directly to a transparency limiting mechanism 5101. When receiving the communication, the transparency limiting mechanism 5101 refers to a transparent information data base of a transparent region 5011 and transfers the resource utilization requesting communication to an object 6001 having one of the names of resources provided by objects in the transparent region 5011 which is coincident with the requested resource name. At this time, the original communication information is saved or stored as in the forgoing examples. The object 6001 receiving the resource utilization requesting communication returns an answer as the result of processing. At this time, when the resource utilization requesting communication includes answeree information as requested resource information, it is possible to return the answer directly to the object 6003 of the original communication addresser, as shown in FIG. 31, since the system is primarily transparent. On the other hand, when the answeree information is not added, the answer is returned to a transferrer address described in the communication information, that is, the transparency limiting mechanism 5101, as in the foregoing examples and, the transparency limiting mechanism 5101 transfers the answer to the object 6003.

(13) CONFIGURATION OF IMPLEMENTATION OF TRANSPARENT REGION

Figure 32:
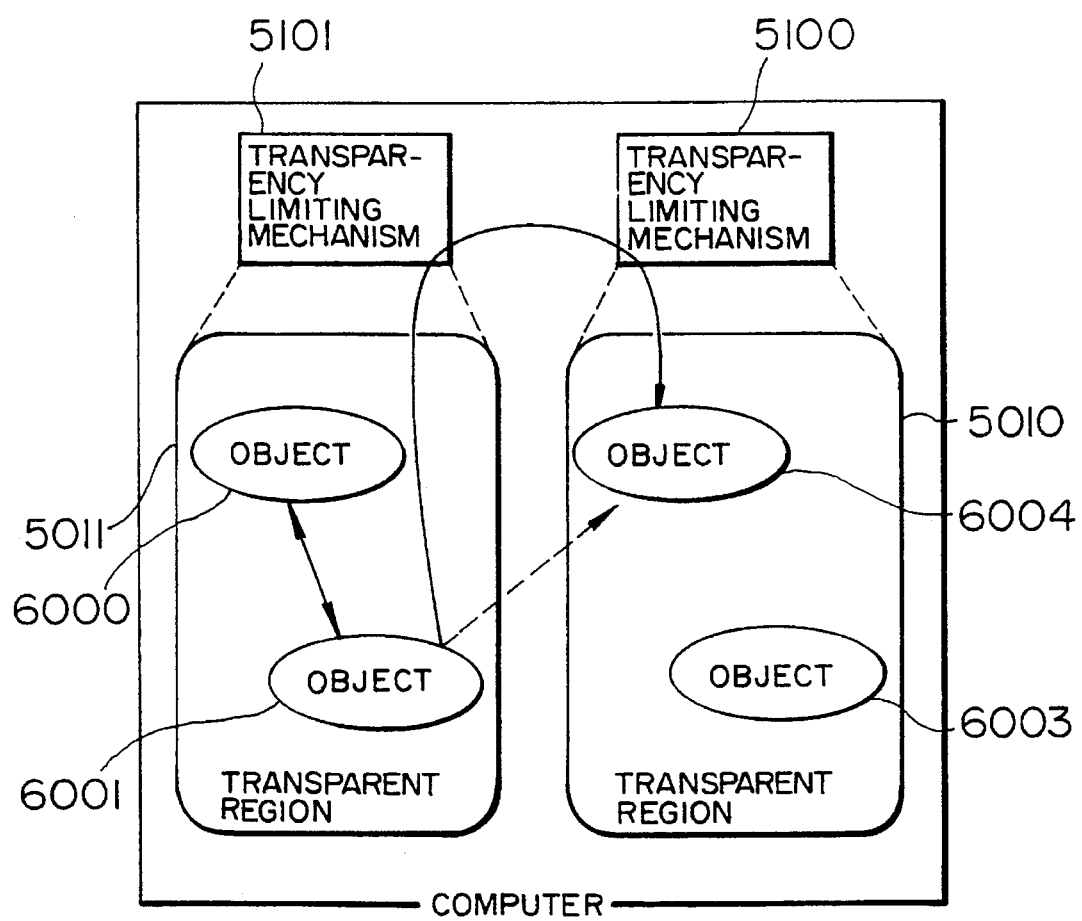
FIG. 32 is a diagram showing an example of the construction of transparent regions in the further embodiment of the present invention.

Next, the configurations of implementation of the transparent region will be explained using FIGS. 32, 33 and 34. The transparent region can be defined so that it does not exist as the hardware construction. Also, the definition itself is dynamically changeable. FIG. 32 shows the case where a plurality of transparent regions 5010 and 5011 are defined on one computer. In this case, communication between objects 6001 and 6004 is directly possible in substance. In the present invention, however, such a communication becomes possible with the intervention of an interprocess communication between transparency limiting mechanisms 5101 and 5100.

Figure 33:
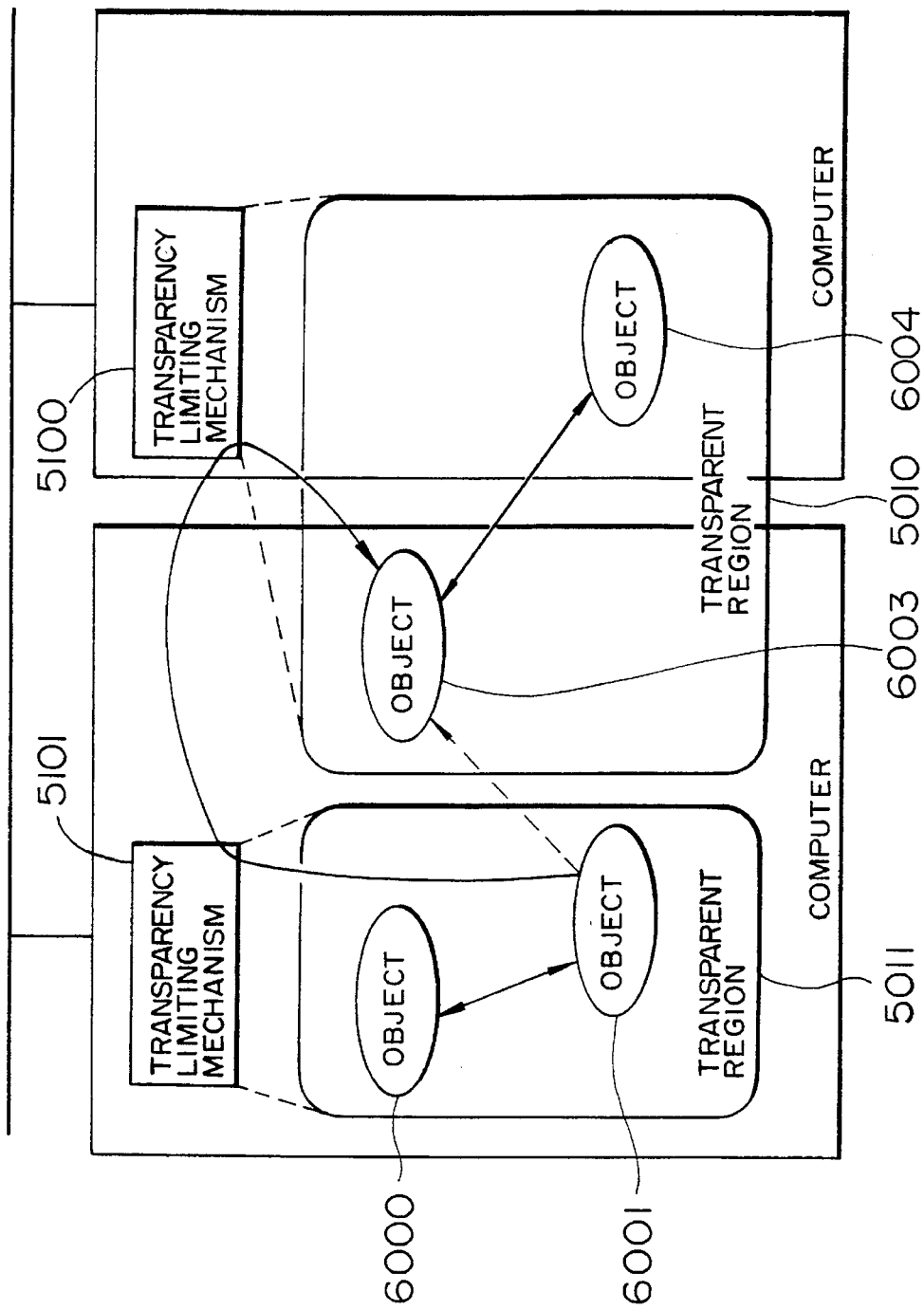
FIG. 33 is a diagram showing another example of the construction of transparent regions in the further embodiment of the present invention.

FIG. 33 shows the case where the same transparent region is defined over a plurality of computers. In this case, a communication between objects 6003 and 6004 belonging to the same transparent region 5010 is directly possible under a transparent network. In the present invention, however, communication between objects 6001 and 6003 existing on the same computer but belonging to different transparent regions 5011 and 5010 becomes possible with the intervention of a network communication between transparency limiting mechanisms 5101 and 5100.

Figure 34:
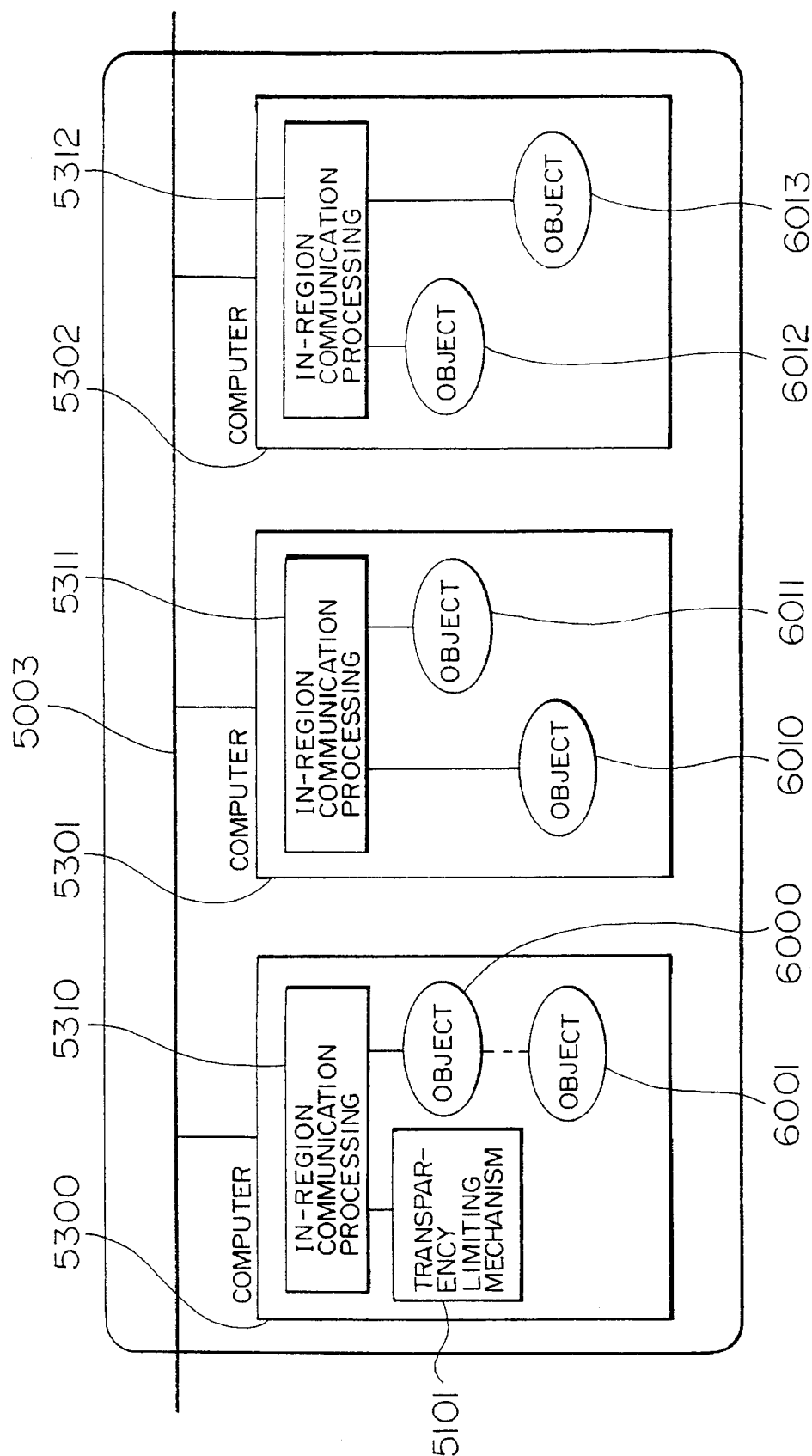
FIG. 34 is a diagram showing a further example of the construction of transparent regions in the further embodiment of the present invention.

FIG. 34 shows the case where one or more computers belong to one transparent region. In this case, at least one transparency limiting mechanism 5101 is required for at least one of computers 5300, 5301 and 5302 which form the transparent region. A communication between objects of different computers is made to each computer through an in-region communication processing 5310, 5311 or 5312 which ensures the transparency in the transparent region. In the shown example, when an object 6010 or 6011 on the computer 5301 sends a communication to the exterior of the transparent region under consideration, the object makes a request to the transparency limiting mechanism 5101 on the computer 5300 through the in-world communication processing 5311 for the transfer of the communication. The same holds for an object 6012 or 6013 on the computer 5302.

As in the above examples, the transparent region can be defined irrespective of the hardware construction, thereby making the structurization of a more flexible large-scale system possible.

(14) STILL FURTHER EMBODIMENT

Figure 35:
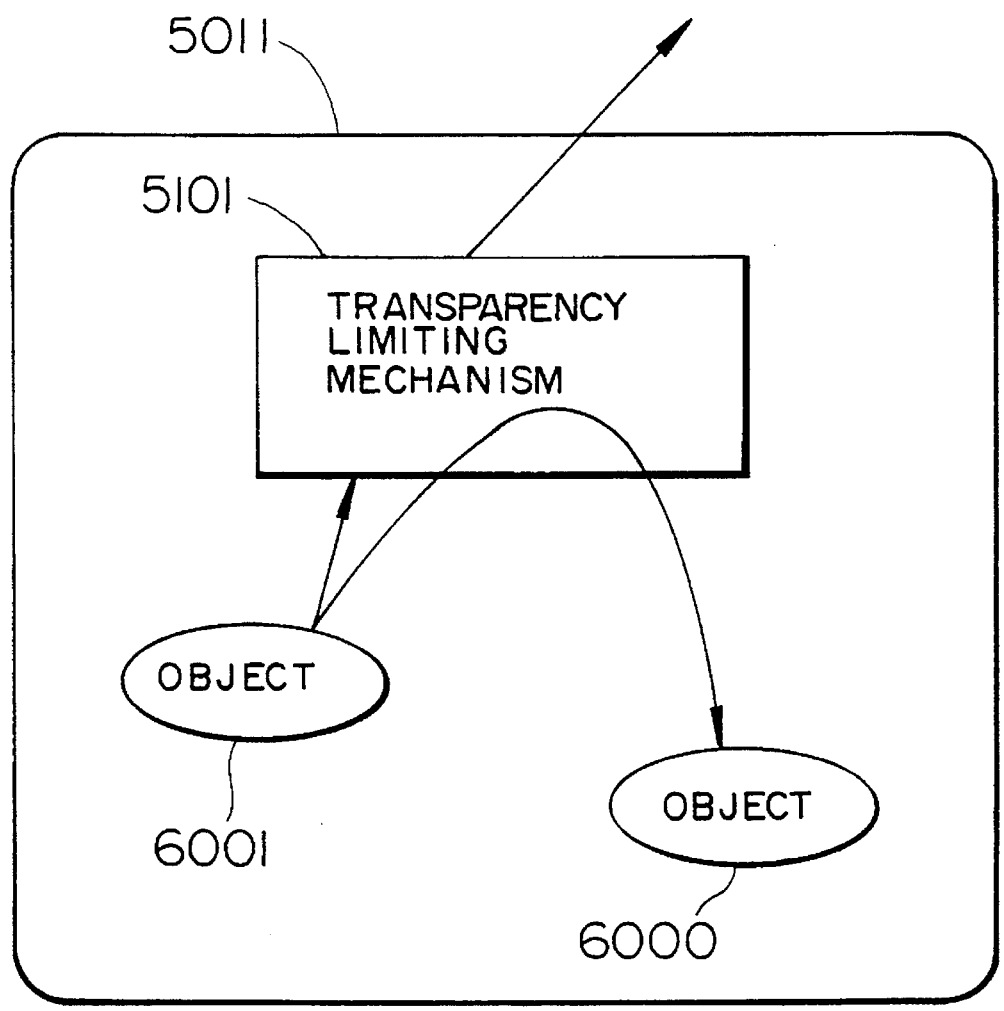
FIG. 35 is a diagram representing a relationship between a transparency limiting mechanism and the communication of objects in a still further embodiment of the present invention.

In the above embodiment, communication between objects in the same transparent region is made directly. However, a communication between an object 6000 and an object 6001 belonging to the same transparent region 5011 can also be made through a transparency limiting mechanism 5101, as shown in FIG. 35. Thereby, it becomes possible to make a communication between objects with no distinction between a communication to the interior of the same transparent region and a communication to the exterior of the transparent region.

Figure 36:
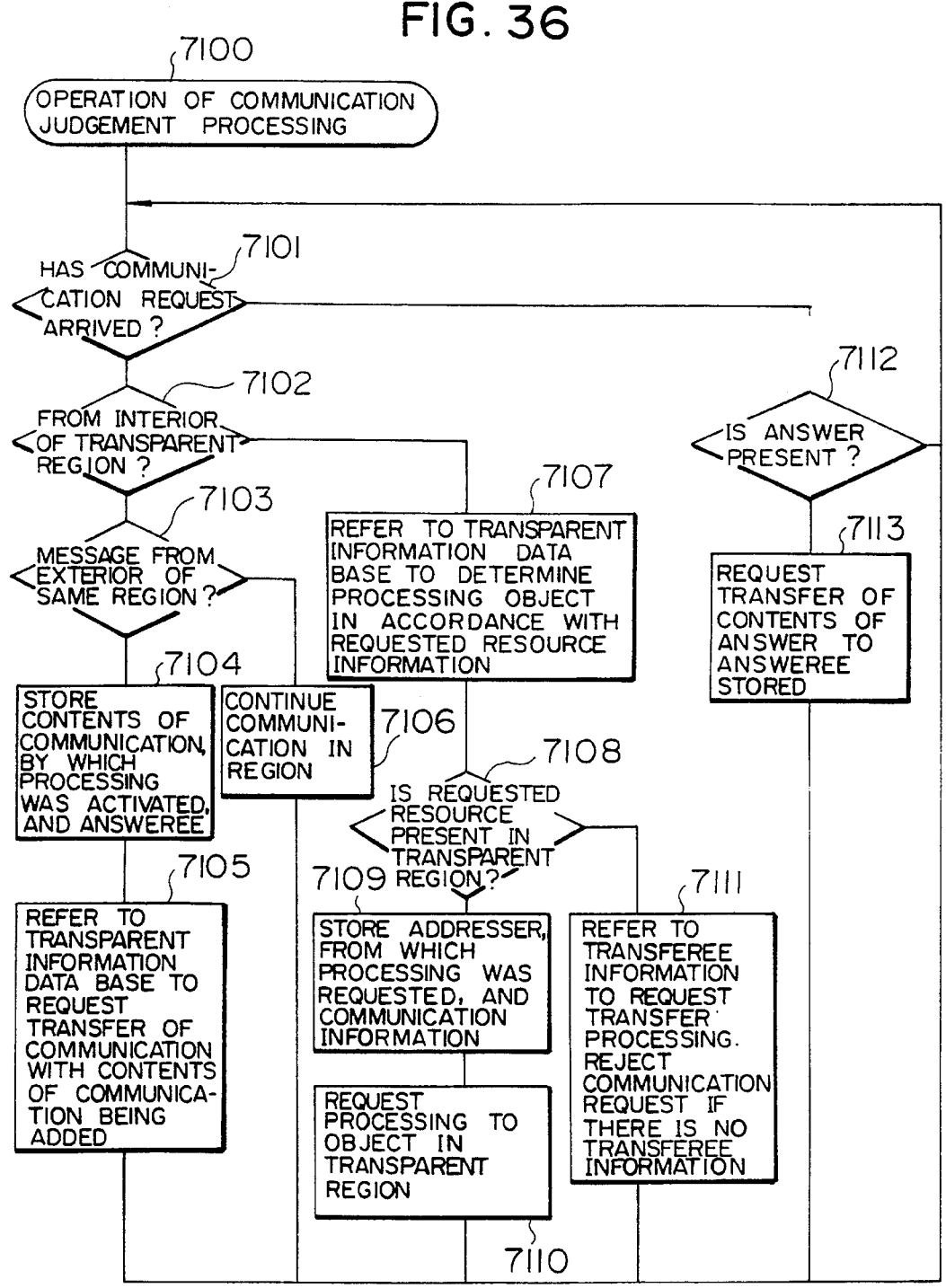
FIG. 36 is a chart showing the operation of a communication judgement processing performed by the transparency limiting mechanism in the still further embodiment of the present invention.

The operation of the transparency limiting mechanism 5101 in that case is shown in FIG. 36. The difference of FIG. 36 from FIG. 37 showing the operation of the transparency limiting mechanism in the foregoing embodiment is such that the judgement is made as to whether or not a communication received by the transparency limiting mechanism is a communication to the interior of the same transparent region (step 7103), and the communication in the same transparent region is continued when the received communication is a communication to the interior of the same transparent region (step 7106). The judgement as to whether the communication received by the transparency limiting mechanism is a communication to the interior of the same transparent region, makes the determination of a communication to the interior of the same transparent region when a requested resource name as requested resource information transmitted by an object is coincident with any one of the names of resources provided by objects in region which are included in transparent region information possessed by a transparent information data base of the same transparent region.

With the above construction, an influence due to a change in network construction in the exterior of a transparent region is eliminated, thereby making it possible to easily realize a system which is capable of flexibly coping with the extension/change of the system.

A transparency limiting unit controls communication between an object in a group of related objects and an object outside the group of related objects. Thereby, a communication with no limitation imposed on the transparency of information is ensured between related objects. On the other hand, as for a communication to an object outside the group of related objects, an operation/reference associated with that object is indirectly made through a communication transfer unit since the transparency is limited by the transparency limiting unit. Accordingly, it becomes possible to manage objects independently in units of one group of related objects, thereby allowing efficient management of each object and reducing a load of resource management and hence a load of maintenance. Also, since it is not necessary to know the details of the exterior of each object group, not only the flexibility of the system is improved but also the production of programs is facilitated. As a result, no load is imposed on a user who structures a large scale system.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A distributed processing system in which a message is communicated between a plurality of objects existing on a plurality of computers connected to at least one network to thereby perform processing of said plurality of objects, said distributed processing system comprising:

at least first and second modules each constituted by a plurality of modularized related objects, said plurality of modularized related objects in each of said first and second modules directly communicate with each other only within the same module;

objectifying means provided on one of said plurality of computers and externally connected between said first and second modules, for accepting said message from said first module as a message which is processed by one of said plurality of modularized related objects of said first module when a message from said first module is at least a part of messages which is processed by said plurality of modularized related objects of said second module, wherein said objectifying means includes a first storage means for storing information representing kinds of said at least a part of messages which are processed by said plurality of modularized related objects of said second module, wherein said objectifying means includes means for, in response to said message from first module, determining whether said message from said first module is acceptable or not by referring to said information in said first storage means; and message transfer means, provided in one of said plurality of computers and connected between said second module and said objectifying means, for transferring said message accepted by said objectifying means to at least one of said plurality of modularized related objects of said second module, wherein said message transfer means includes a second storage means for storing information representing a kind of message, for each of said plurality of modularized related objects of said second module, which is processed by said each of said plurality of modularized related objects of said second module, and wherein said message transfer means includes means for, as to a message determined being acceptable by said objectifying means, determining said at least one object to which said message determined to be acceptable is transferred with reference to said information of said second storage means, and for transferring said message determined to be acceptable to said at least one object.

2. A distributed processing system according to claim 1, wherein said second storage means stores at least one message name as said information representing a kind of message that is processed by said each of said plurality of modularized related objects of said second module for each of said plurality of modularized related objects of said second module, and wherein said message transfer means includes means for selecting said at least one object to which said message determined to be acceptable is transferred with reference to said information of said second storage means based on a message name of a message determined to be acceptable by said objectifying means, and for transferring said message determined to be acceptable to said at least one object.

3. A distributed processing system according to claim 1, wherein said message is realized by a remote procedure call.

4. A distributed processing system according to claim 1, wherein said message transfer means also transfers said message accepted by said objectifying means to at least one other object of said plurality of modularized related objects of said second module.

5. A distributed processing system according to claim 1, wherein said message transfer means converts said message into a message having a format which can be received by a transferee object and thereafter transmits the converted message to said transferee object.

6. A distributed processing system according to claim 1, wherein said first module sends a message as said message from said first module when another object of said plurality of modularized related objects of said first module issues a message to said one object of said first module, and wherein said objectifying means includes means for, in response to said message from said first module, determining whether said message from said first module is acceptable or not.

7. A distributed processing system according to claim 1, wherein said at least one object of said second module includes means for processing said message transferred from said message transfer means.

8. A distributed processing system according to claim 7, wherein said message transfer means includes means for applying a result of processing of said at least one object to said objectifying means, and wherein said objectifying means includes means for applying said result of processing to said first module, so that said first module performs a processing by using said result of said processing.

* * * * *